(12) United States Patent
Ishii et al.

(10) Patent No.: US 7,095,363 B2
(45) Date of Patent: Aug. 22, 2006

(54) PULSE RADAR APPARATUS

(75) Inventors: Satoshi Ishii, Kawasaki (JP);
Yoshikazu Dooi, Kawasaki (JP);
Hiroyuki Yatsuka, Kawasaki (JP);
Tetsuo Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 10/809,461

(22) Filed: Mar. 26, 2004

(65) Prior Publication Data

US 2005/0078030 A1 Apr. 14, 2005

(30) Foreign Application Priority Data

Oct. 9, 2003 (JP) .............................. 2003-351287

(51) Int. Cl.
*G01S 13/08* (2006.01)
(52) U.S. Cl. .............................. 342/70; 342/85; 342/94; 342/128; 342/137
(58) Field of Classification Search ............ 342/70–72, 342/82–85, 94–103, 128–137, 192–196
See application file for complete search history.

(56) References Cited

U.S. PATENT DOCUMENTS

| 2,713,160 | A | * | 7/1955 | Trachtenberg et al. ...... 342/102 |
| 3,594,795 | A | * | 7/1971 | Thor et al. .................. 342/201 |
| 3,868,687 | A | * | 2/1975 | Goldman et al. ........... 342/134 |
| 4,675,684 | A | * | 6/1987 | Spence ....................... 342/394 |
| 5,457,394 | A | | 10/1995 | McEwan |
| 6,067,040 | A | | 5/2000 | Puglia |
| 6,232,910 | B1 | * | 5/2001 | Bell et al. .................... 342/70 |
| 6,509,864 | B1 | | 1/2003 | Mende et al. |
| 6,587,072 | B1 | | 7/2003 | Gresham et al. |
| 7,006,033 | B1 | * | 2/2006 | Ishii et al. .................. 342/127 |
| 7,023,376 | B1 | * | 4/2006 | Kuroda et al. ............... 342/70 |
| 7,023,377 | B1 | * | 4/2006 | Axelsson .................... 342/109 |
| 2003/0193430 | A1 | * | 10/2003 | Gresham et al. ............. 342/70 |
| 2005/0179585 | A1 | * | 8/2005 | Walker et al. .............. 342/134 |
| 2006/0061505 | A1 | * | 3/2006 | Kinghorn ................. 342/25 A |
| 2006/0092073 | A1 | * | 5/2006 | Boecker et al. ............... 342/70 |

FOREIGN PATENT DOCUMENTS

| JP | 2000-241535 | 9/2000 |
| JP | 2001-116822 | 4/2001 |
| WO | 98/13704 | 4/1998 |

OTHER PUBLICATIONS

"Radar range tracker using adaptive switching model", Leung, S.W.Electronics Letters vol. 28, Issue 12, Jun. 4, 1992 pp. 1133-1135.*
Communication from European Patent Office for European Patent Application No. 04 251 327.5-2220; dated Aug. 19, 2005.

(Continued)

*Primary Examiner*—John B. Sotomayor
(74) *Attorney, Agent, or Firm*—Staas & Halsey LLP

(57) ABSTRACT

A pulse radar apparatus uses different frequencies, for example, frequencies one of which is a multiple or a submultiple of the other for a signal which becomes a reference of a control pulse for controlling a gate operation for a reception signal and a signal which becomes a base of generation of a transmission pulse. As a result, even if noise is caused by the gate operation, its influence can be removed in the processing of reception signals having different frequencies.

12 Claims, 34 Drawing Sheets

OTHER PUBLICATIONS

M. Morikami et al., "Method for Measuring the Distance and Velocity of a Moving Object as Short Range", Journal of 2000 General Meeting of the Institute of Electronics, Information and Communication Engineers, B-2-2, p. 215.

N. Ohkubo et al., "60 GHz Millimeter-Wave Automotive Radar", Fujitsu, vol. 47, No. 4, pp. 332-337.

European Search Report, Jun. 25, 2004, for EP 04 25 1327, pp. 1-3.

* cited by examiner

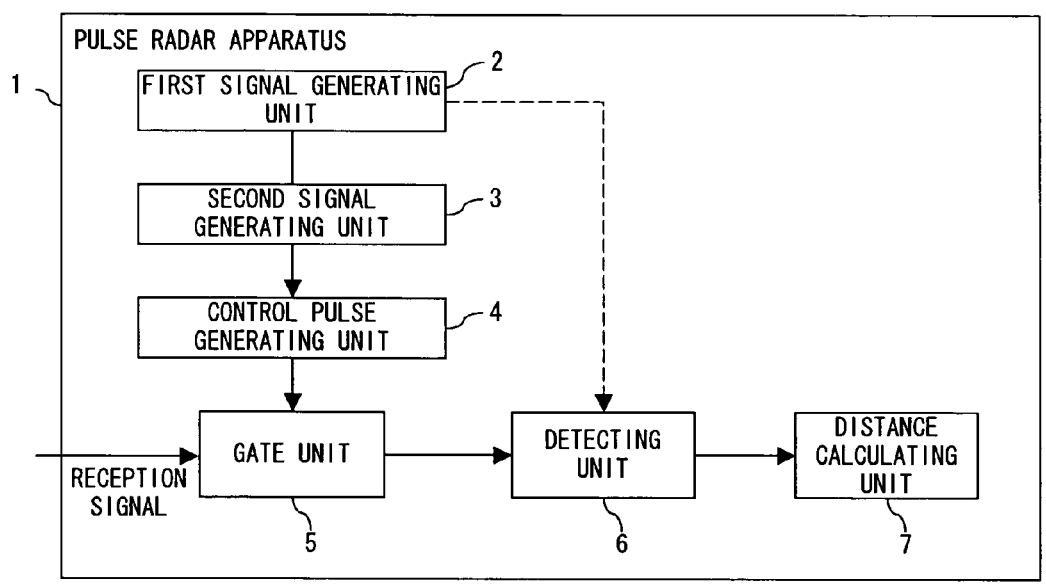
F I G. 3

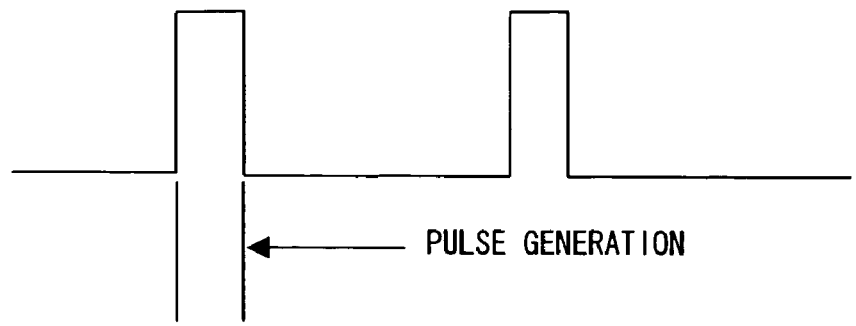
F I G. 6 A
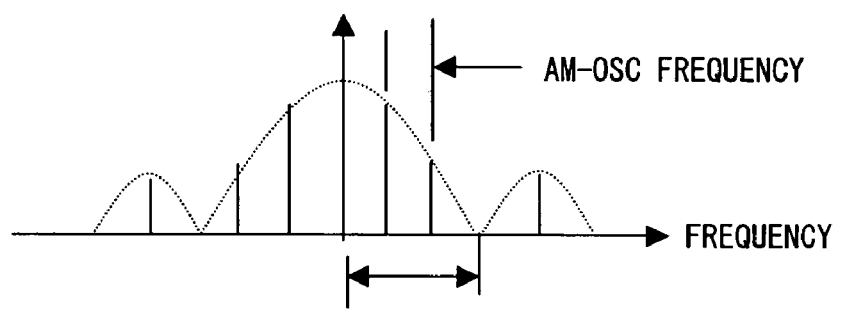
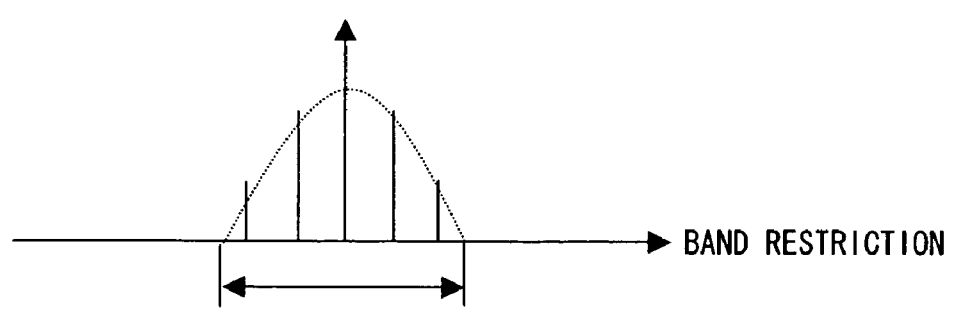
F I G. 6 B

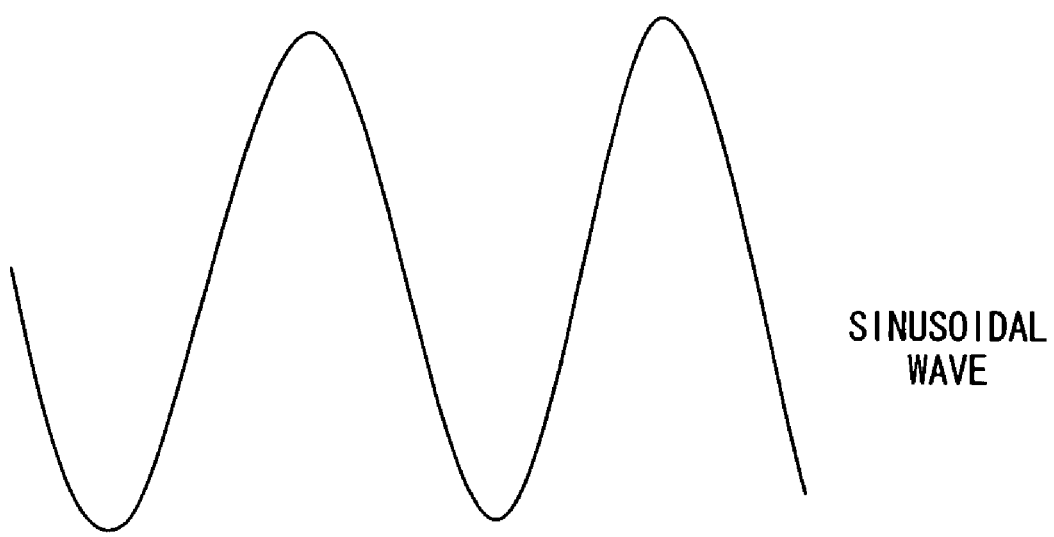
F I G. 9 A
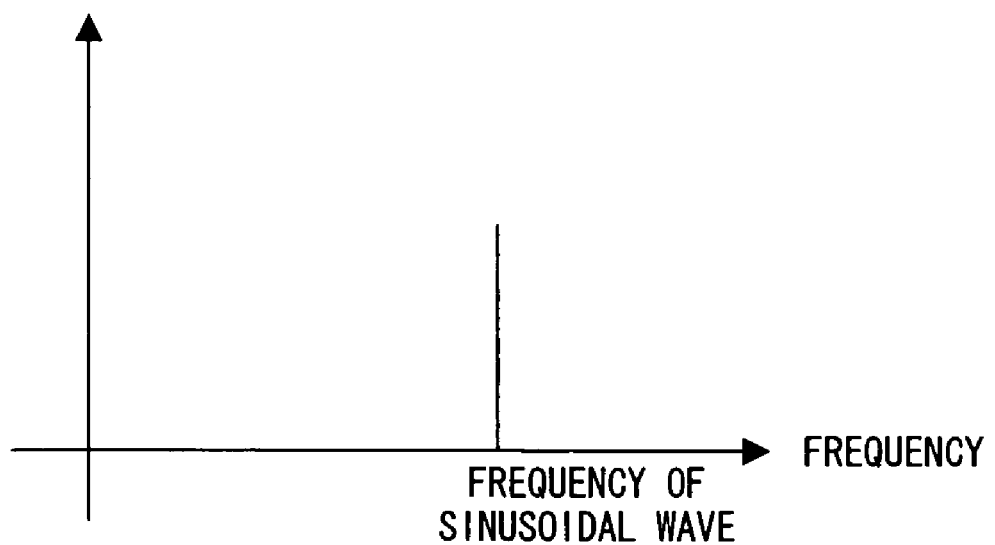
F I G. 9 B

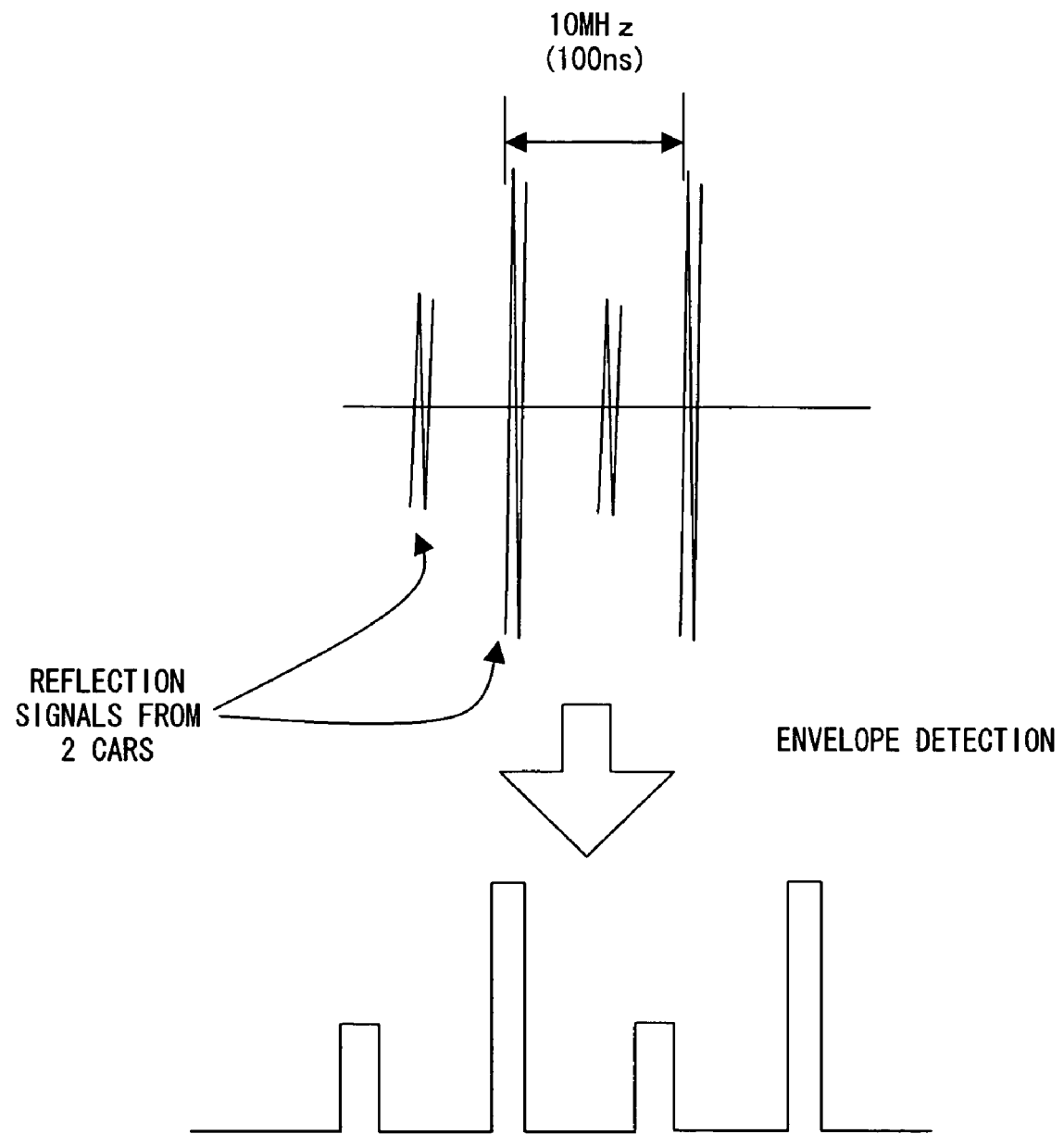
F I G. 1 1

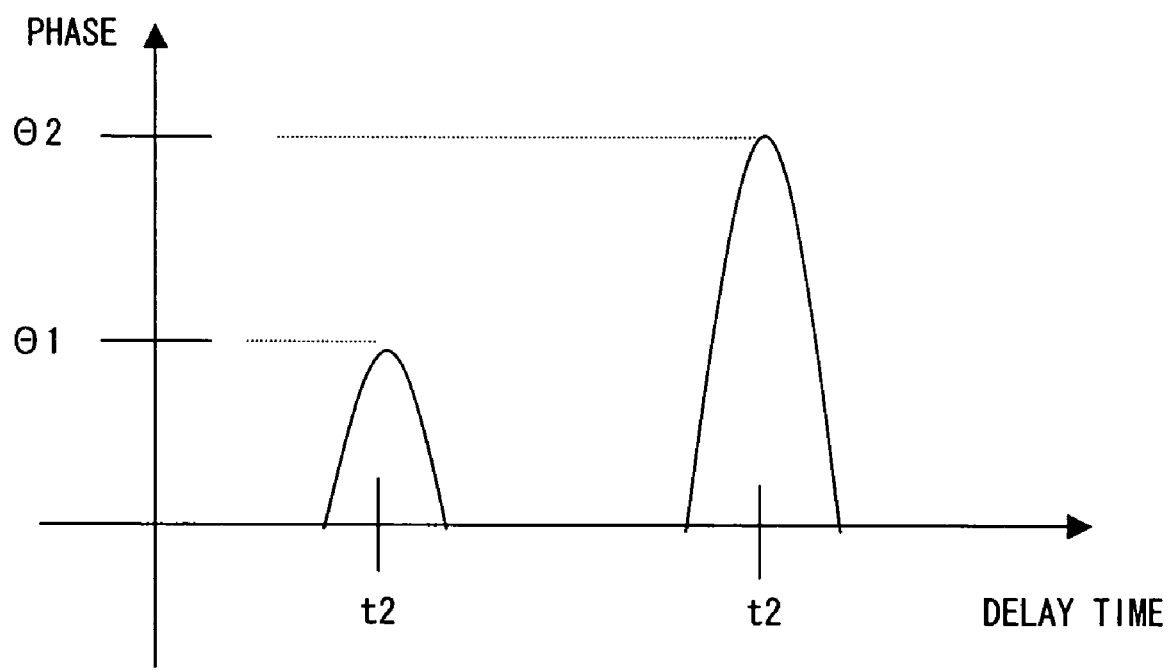
F I G. 1 6

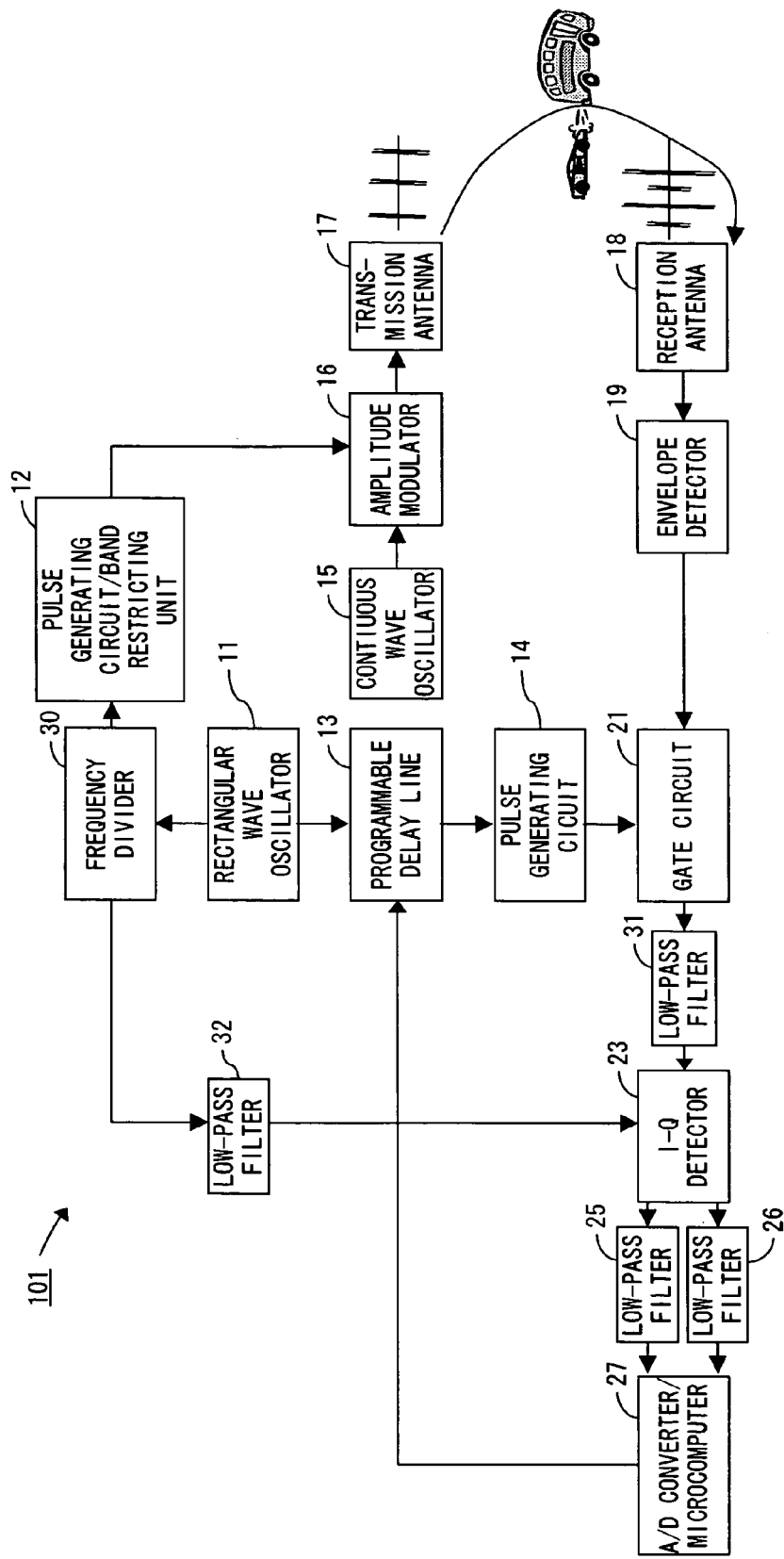
F I G. 1 8

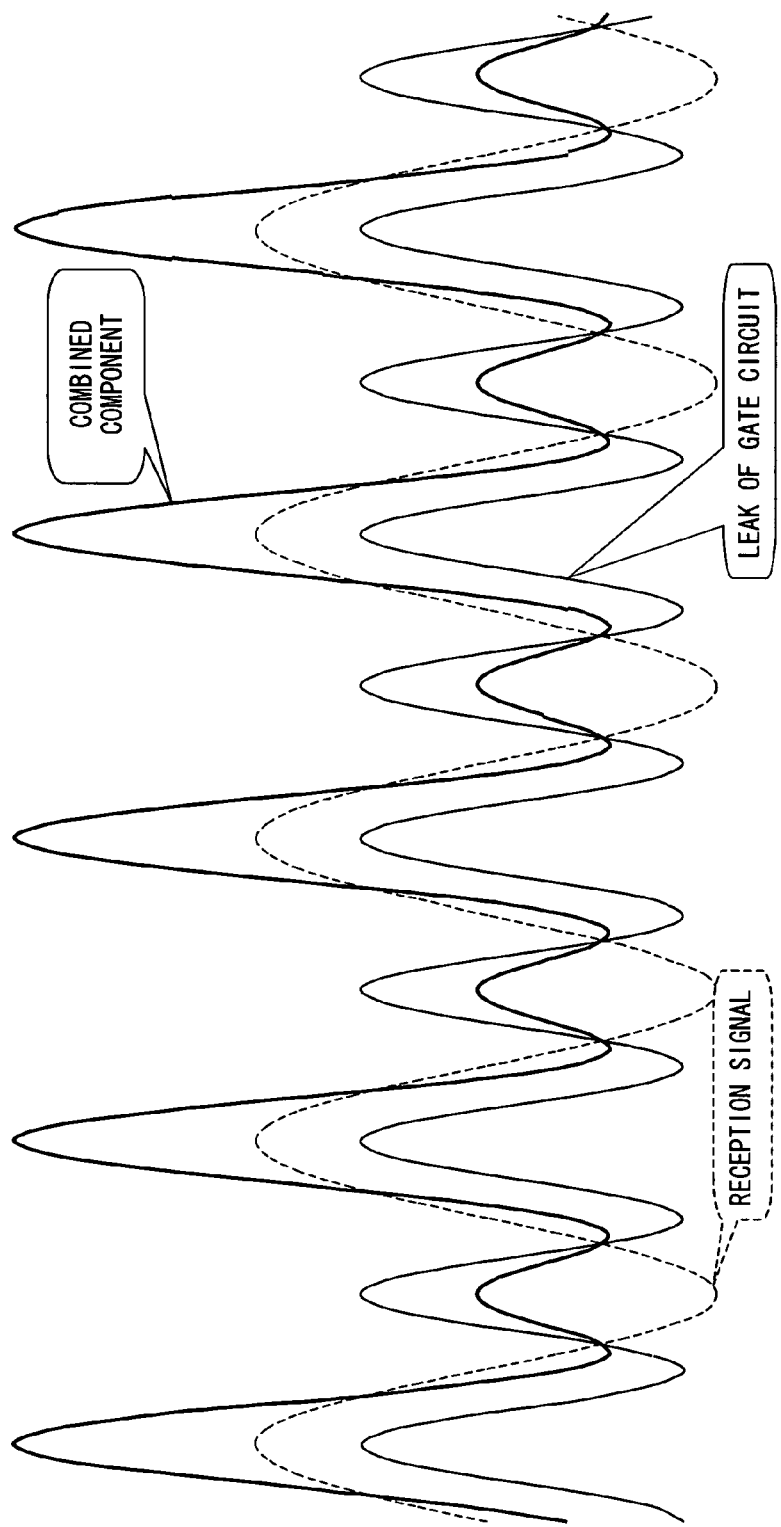
F I G. 2 1

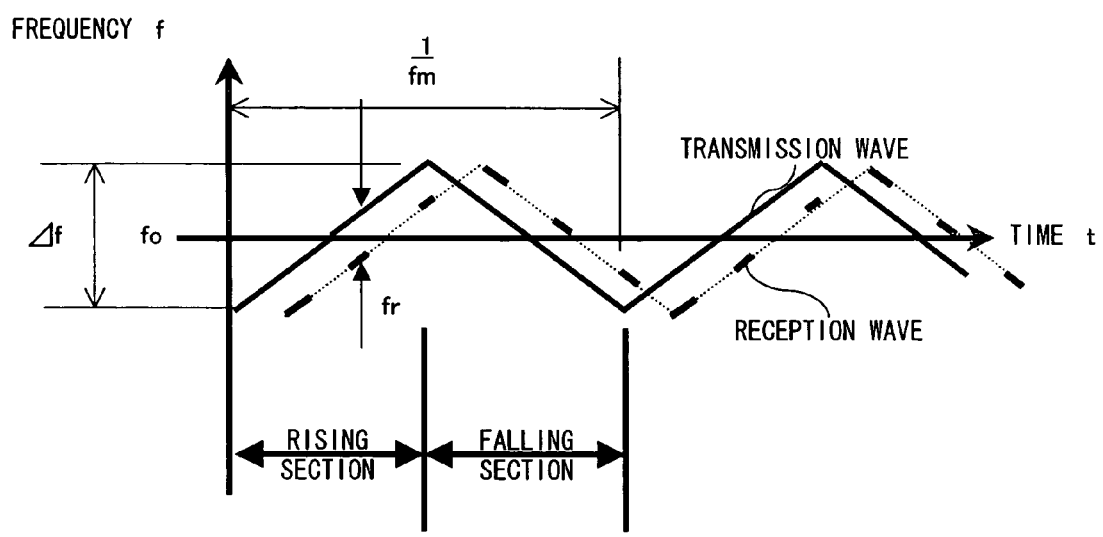
F I G. 2 8

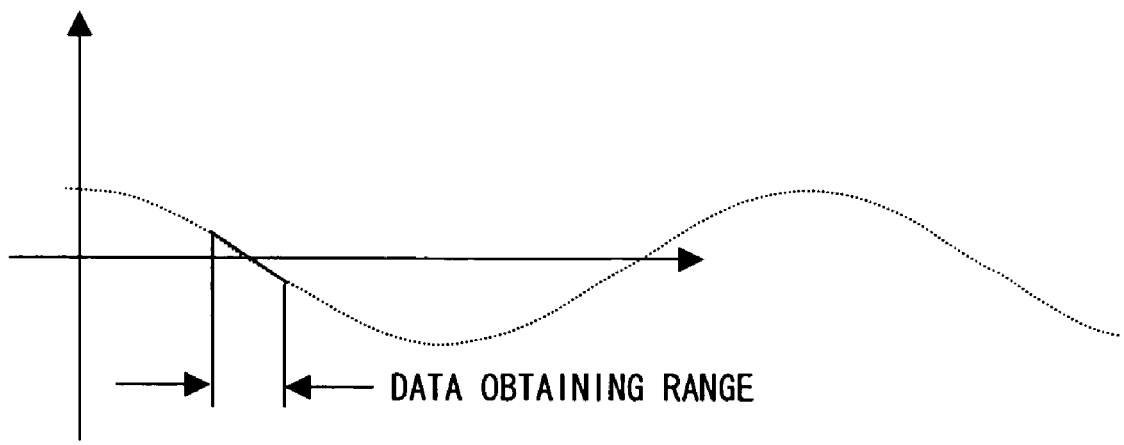
WHEN BEAT FREQUENCY IS LOW
(SHORT DISTANCE)
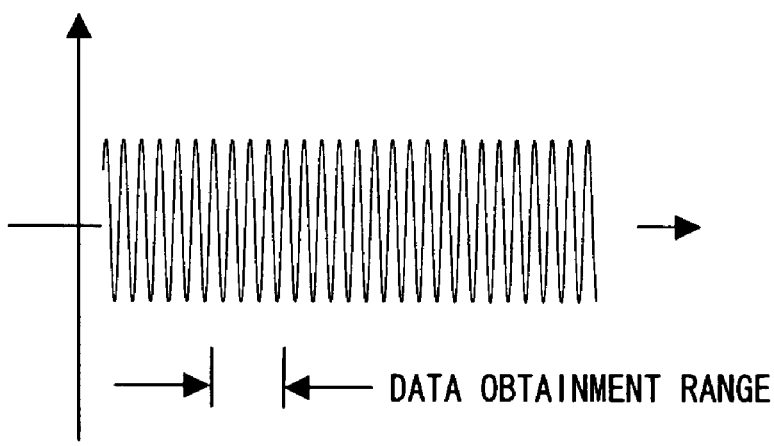
WHEN BEAT FREQUENCY IS HIGH
(LONG DISTANCE)
TIME WAVEFORM OF I OUTPUT
(OUTPUT OF LPF25)
FIG. 31

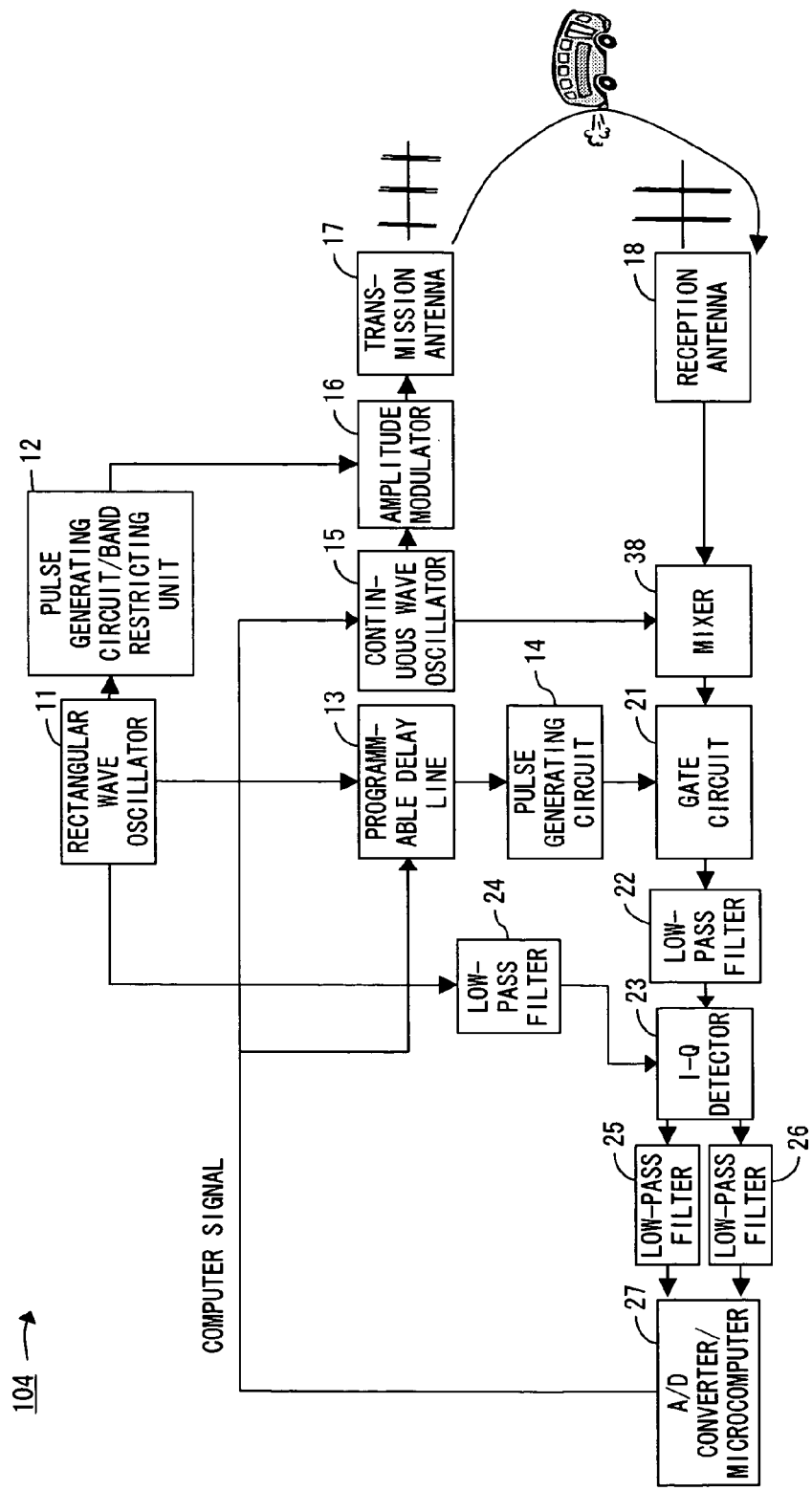
F I G. 3 2

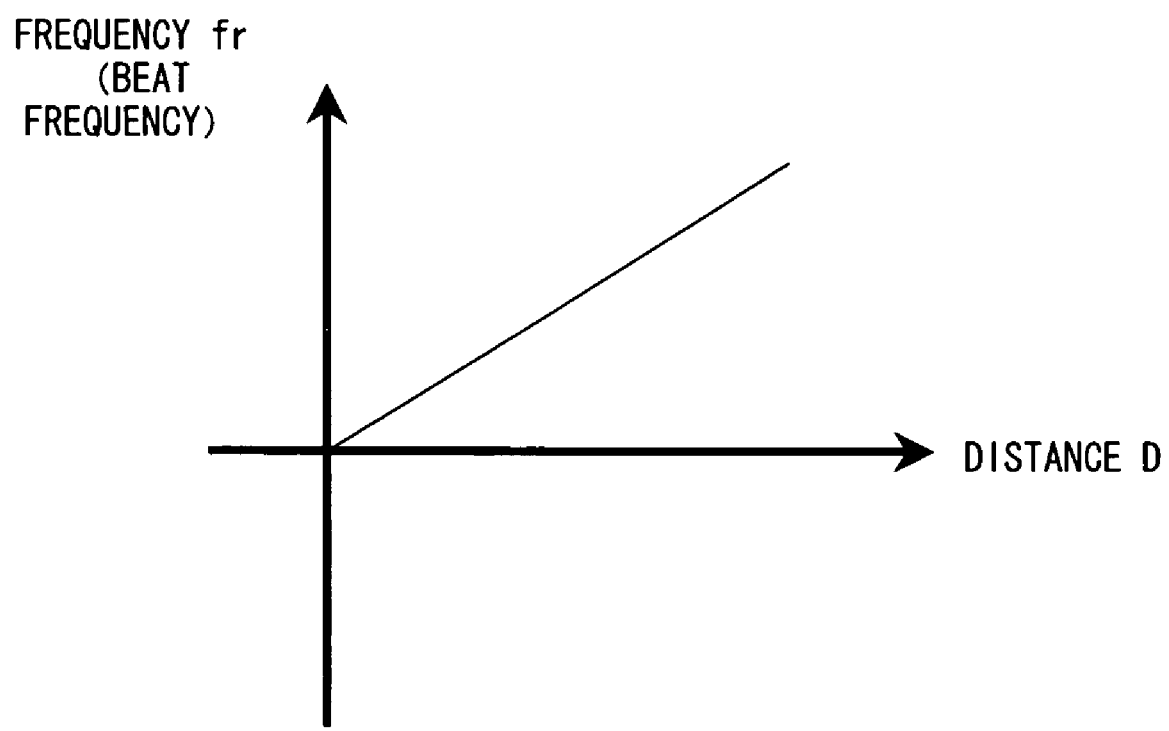
F I G. 3 3

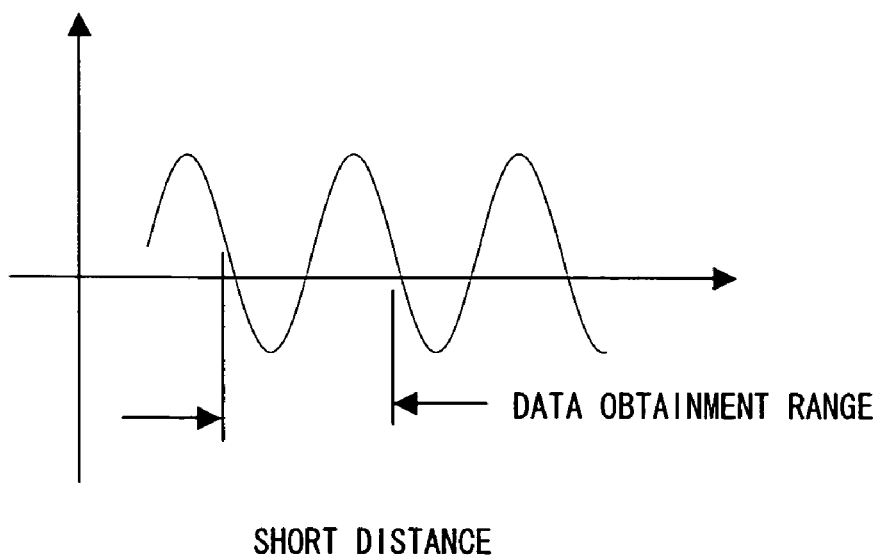
SHORT DISTANCE
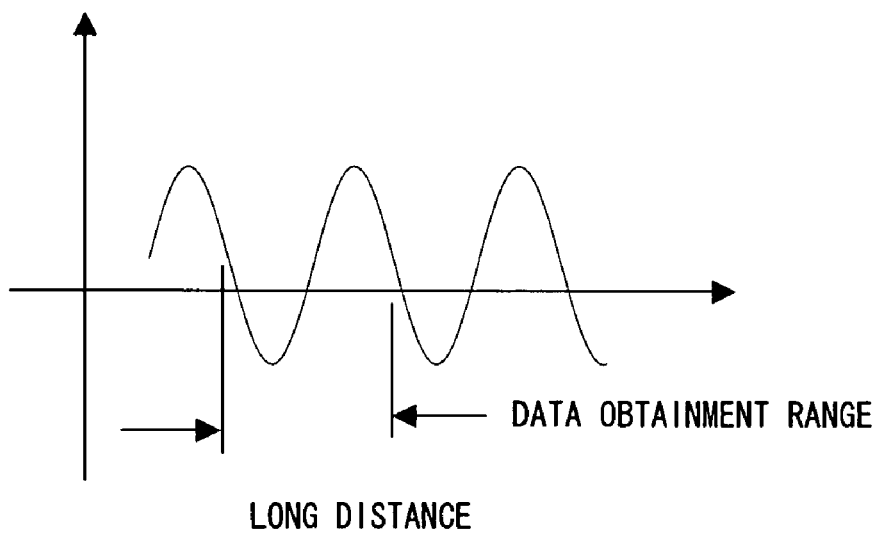
LONG DISTANCE
TIME WAVEFORM OF I OUTPUT
(OUTPUT OF LPF25)
F I G. 3 4

PULSE RADAR APPARATUS

BACKGROUND OF THE INVENTION

1. Field of the Invention

The present invention relates to a method of a radar detecting a target by emitting a radio wave and by receiving its reflection wave, and more particularly, to a pulse radar apparatus which emits a transmission radio wave of a high frequency in a pulse form, by generally, separating it into equal sections and by putting them, is available for a short-distance measurement, and has a high resolution.

2. Description of the Related Art

For currently used radars, most of them are pulse radars. The pulse radars can generally detect a target that exists in a long distance, and can measure a distance to the target. Various signal processing techniques used for such pulse radars are described in "M. Sekine, Radar Signal Processing Techniques, The Institute of Electronics, Information and Communication Engineers".

Additionally, as conventional techniques for detecting a target that exists in a relatively short distance, the following techniques exist. Firstly, "Moriue, Nakatsukasa, A Method for Distance/Speed Measurement of Short-distance Mobile Object, National Convention of IEICE, 2000, B-2-2, p. 215"proposes a method measuring the distance and the speed of a mobile object in a distance of up to 125 m by using a microwave of a 9.5-GHz band, which is amplitude-modulated by a sinusoidal wave signal.

Additionally, Japanese Patent Publication No. 2001-116822 "Microwave Band Pulse transmitter/Receiver" discloses a microwave band pulse transmitter/receiver of a small size, low-cost, and low power consumption, which uses a microwave band weak radio wave and is fit for uses such as a data communication, a sensor, a measuring instrument, etc. Also in this document, a gate is used in a similar manner as in embodiment of the present invention. The gate in this document, however, is intended to suppress oscillation, and it use purpose is different from that of the present invention.

Furthermore, Japanese Patent Publication No. 2000-241535 "Short-Distance Radar Apparatus" discloses a high-resolution and short-distance radar the use of which is permitted by a simple license application, and the outdoor use of which is enabled without worrying about a radio wave interference, and various applications of which are expected to be implemented with an outdoor non-contact distance measurement.

As described above, the conventional pulse radars were used in a relatively long distance to a target, which is equal to or longer than several tens of meters. To use a pulse radar for a short-distance measurement, its pulses must be sharpened, the frequency bandwidth for the application must be widened, and the bandwidth of a component to be used for the radar must be widened, so that its implementation is difficult.

FIGS. 1 and 2 explain the bandwidths of this pulse radar. FIG. 1 explains the bandwidths used for normal AM and FM signals, etc. For the AM and the FM signals, their bandwidths are limited to narrow ones that center the frequency of a carrier wave. Therefore, a noise influence can be suppressed.

FIG. 2 explains the bandwidth of a pulse radar. The narrower the pulses of a pulse radar, the wider its bandwidth. As a result, noise power N of a total bandwidth becomes large even if signal power S is the same, so that an S/N (signal-to-noise) ratio is deteriorated, and the radar becomes susceptible to a noise influence. Especially, the S/N ratio is deteriorated at 1 GHz or higher, and various problems can occur. If the width of a pulse is widened to suppress the S/N ratio, the bandwidth becomes narrow and the noise N becomes small. However, the minimum distance to a detectable target becomes long.

To set the short-distance detection limit to on the order of 15 cm with the above described conventional techniques of pulse radars, the width of a pulse must be changed to on the order of 1 nsec. To implement this, a bandwidth of approximately 1 GHz is required, and also a noise bandwidth is as wide as 1 GHz, so that the S/N ratio is significantly deteriorated, and it becomes very difficult to detect a target.

Additionally, a general-purpose digital LSI such as a DSP, etc. cannot be used, because a signal having a pulse width of approximately 1 nsec or a frequency bandwidth of approximately 1 GHz is handled. Therefore, a circuit must be configured with a semiconductor specifically developed for high-speed processing, which costs very high, and a mass-production is difficult due to fluctuations of characteristics.

Additionally, the conventional techniques generally use a method performing the I-Q detection for a reflection wave, namely, a reception wave, obtaining an I (synchronous) component and a Q (orthogonal) component with a reference sinusoidal wave, performing A/D conversion respectively for the I and the Q components, and executing signal processing with a processor for its result. However, this method requires A/D converters and filters for two systems, leading to an increase in cost.

SUMMARY OF THE INVENTION

A first object of the present invention is to provide a pulse radar apparatus, which has a short distance detection limit and a high distance resolution, without using a specifically developed semiconductor in view of the above described problems.

A second object of the present invention is to improve the detection accuracy of the pulse radar apparatus by improving an S/N (Signal-to-Noise) ratio without being influenced by noise even if the noise occurs, for example, from a circuit itself, which detects a reflection signal from a target.

A third object of the present invention is to provide a low-cost pulse radar apparatus without using an I-Q detector that requires an A/D converter and filters for each of the two systems.

A pulse radar apparatus according to the present invention uses different frequencies, i.e., frequencies one of which is a multiple or a submultiple of the other for a signal used as the reference of a control pulse for controlling a gate operation for a reception signal and for a signal which becomes a base of generation of a transmission pulse. As a result, even if noise is caused by a gate operation, its influence can be removed in the processing for receiving signals having different frequencies.

BRIEF DESCRIPTION OF THE DRAWINGS

FIG. 3 is a block diagram showing the principle configuration of a pulse radar apparatus according to the present invention;

FIG. 6A is a schematic (No. 1) explaining the output of a pulse generating circuit/band restricting unit;

FIG. 6B is a schematic (No. 2) explaining the output of the pulse generating circuit/band restricting unit;

FIG. 9A is a schematic (No. 1) explaining the output of a continuous wave oscillator;

FIG. 9B is a schematic (No. 2) explaining the output of the continuous wave oscillator;

FIG. 11 shows the output of an envelope detector;

FIG. 16 shows the relationship between a phase difference obtained from the output of the detector and the delay time of the delay line;

FIG. 18 is a block diagram showing the configuration of an embodiment 1 of the pulse radar apparatus according to the invention;

FIG. 21 explains a component on which a reception signal in the output of the gate circuit and the leak of the gate circuit are superposed;

FIG. 28 explains a frequency modulation method;

FIG. 31 explains problems posed in the pulse radar apparatus shown in FIG. 27;

FIG. 32 is a block diagram showing the configuration of an embodiment 4 of the pulse radar apparatus according to the invention;

FIG. 33 shows the relationship between the distance to a target and a beat frequency; and FIG. 34 explains the output waveforms of an I component in the embodiment 4.

DESCRIPTION OF THE PREFERRED EMBODIMENTS

Figure 1:
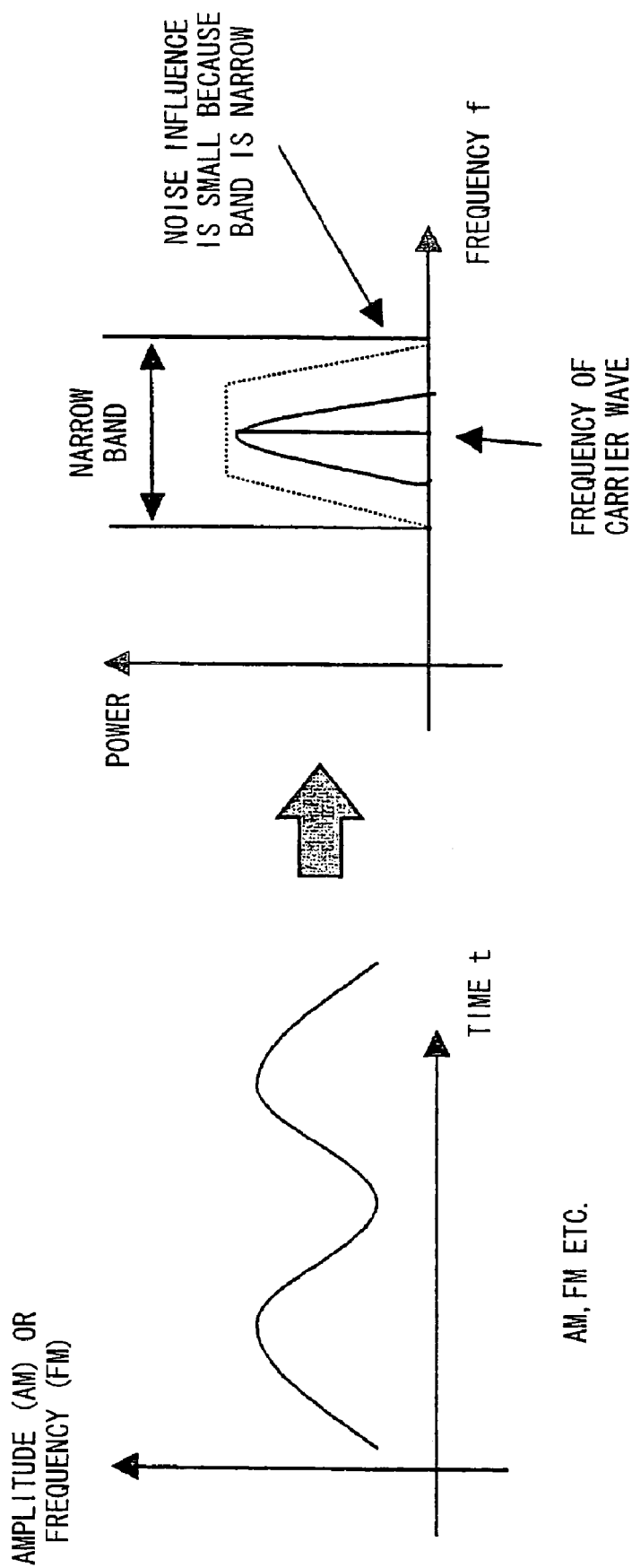
FIG. 1 is a schematic (No. 1) explaining a noise influence in a conventional technique.
Figure 2:
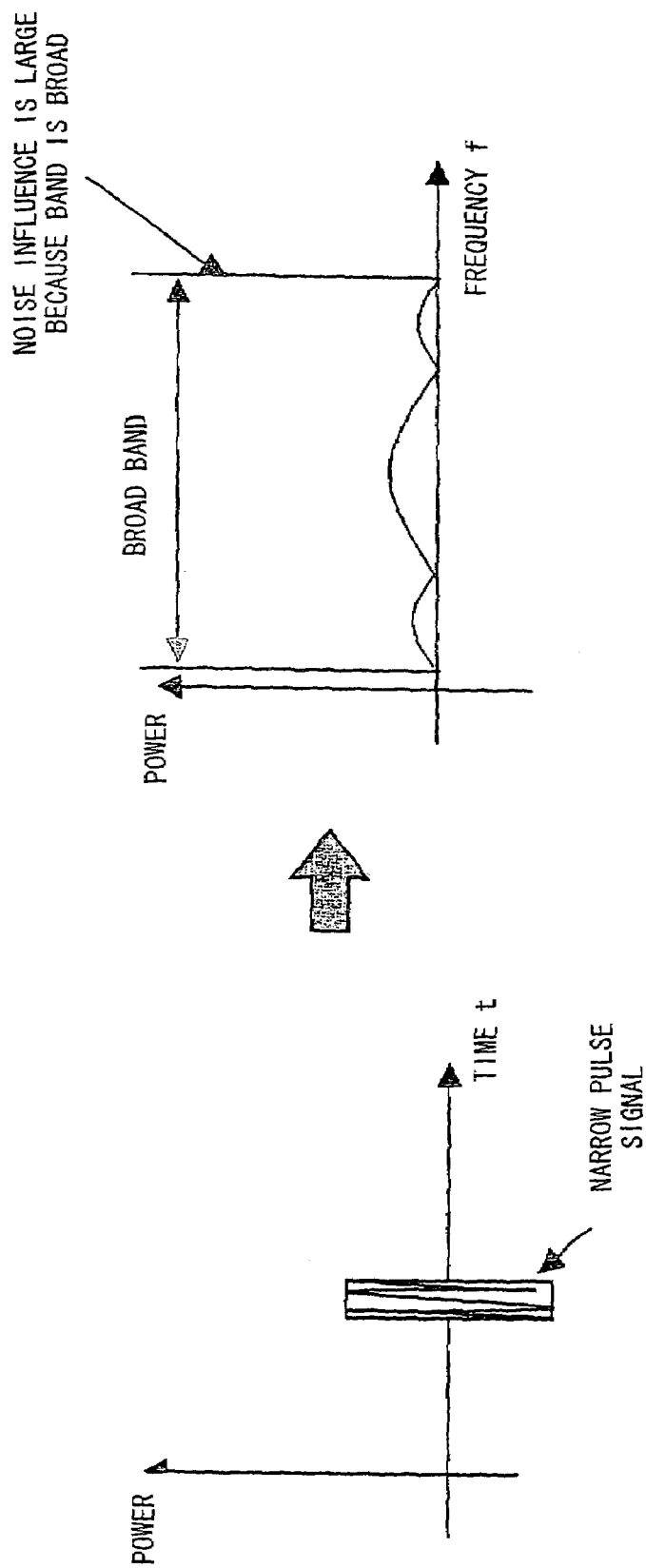
FIG. 2 is a schematic (No. 2) explaining a noise influence in a conventional technique.

Preferred embodiments according to the present invention are described in detail with reference to the drawings.

FIG. 3 is a block diagram showing the principle configuration of a pulse radar apparatus according to the present invention. This figure is a block diagram showing the principle configuration of a pulse radar apparatus as an embodiment 1 of the present invention, which will be described later. The pulse radar apparatus 1 comprises a first signal generating unit 2, a second signal generating unit 3, a control pulse generating unit 4, and a gate unit 5.

The first signal controlling unit 2 generates a first signal, which becomes a base of generation of a transmission pulse. The second signal generating unit 3 outputs a second signal whose frequency is a multiple or a submultiple of the frequency of the first signal, and whose phase angle and the phase angle of the first signal at least intermittently and simultaneously match each other at 0.

The control pulse generating unit 4 generates a control pulse signal by delaying an output of the second signal generating unit 3, for example, a rectangular wave oscillator. The gate unit 5 performs agate operation for a reception signal by using the generated control pulse signal.

In a preferred embodiment according to the present invention, the apparatus can further comprise a detecting unit 6 detecting an output of the gate unit 5 based on the first signal, and a distance calculating unit 7, while the control pulse generating unit 4 changes its delay amount, calculating a distance to a target in response to a delay amount for which a component of the output from the detecting unit 4 which component corresponds to the amplitude of the reception signal becomes the maximum. Alternatively, the apparatus 1 may use a distance calculating unit 7 calculating a distance to a target in response to a phase difference between the first signal and the reception signal when the control pulse generating unit 4 changes the delay amount.

Additionally, in the preferred embodiment, the apparatus can further comprise a modulation signal generating unit generating a modulation signal for generating a transmission pulse generating modulation signal by generating a pulse from the first signal, and by band-restricting a spectrum range of the pulse.

A pulse radar apparatus according to the present invention comprises: a signal delaying unit delaying a signal, which becomes a base of generation of a transmission pulse; a control pulse generating unit generating a control pulse signal by using the delayed signal; a gate unit performing a gate operation for a reception signal by using the control pulse signal; and a reflection signal detecting unit detecting a reflection signal from a target which exists in a distance corresponding to a delay time by using an output of the signal delaying unit based on an output of the gate unit.

In a preferred embodiment according to the present invention, the apparatus can further comprise a distance calculating unit for, while the signal delaying unit changes the delay amount of the signal which becomes the base, calculating a distance to a target in response to a delay amount for which a component of the output from the reflection signal detecting unit which component corresponds to an amplitude of a reception signal becomes the maximum.

A pulse radar apparatus according to the present invention comprises: a signal delaying unit delaying a first signal according to a delay amount of a second signal which is generated by the control pulse generating unit 4; and a reflection signal detecting unit detecting a reflection signal from a target which exists in a distance corresponding to a delay time by using an output of the signal delaying unit based on an output of the gate unit 5 in addition to the first signal generating unit 2, the second signal generating unit 3, the control pulse generating unit 4, and the gate unit 5, which are described with reference to FIG. 3.

In a preferred embodiment according to the present invention, the apparatus can further comprise a distance calculating unit calculating a distance to a target in response to a delay amount for which a component corresponding to an amplitude of the reception signal becomes the maximum as described above.

A pulse radar apparatus according to the present invention comprises: a pulse transmitting unit outputting a transmission pulse signal by using a pulse signal generated from a signal which becomes a base of the generation of a transmission pulse and a frequency-modulated continuous wave; a control pulse generating unit generating a control pulse signal by delaying the signal which becomes the base; a gate unit performing a gate operation for a reception signal by using the control pulse signal; and a modulation controlling unit controlling a frequency modulation width of the frequency modulation and/or a repetitive frequency of the modulation in response to the signal delay amount generated by the control pulse generating unit.

In a preferred embodiment, as described above, the apparatus can comprise a detecting unit detecting an output of the gate unit based on the signal which becomes the base, and a distance calculating unit calculating while the control pulse generating unit changes the delay amount, a distance to a target in response to either of a delay amount with which a component corresponding to an amplitude of the reception signal becomes the maximum, or a phase difference from the reception signal which becomes the base. Or, the apparatus can further comprise a modulation signal generating unit similar to the above described one.

As described above, according to the present invention, different frequencies, for example, frequencies one of which is a multiple or a submultiple of the other, are used, by way of example, for the second signal which becomes a reference of a control pulse for controlling a gate operation for a reception signal and a first signal which becomes a base of generation of a transmission pulse. Therefore, even if noise is caused by the gate operation, its influence can be removed in the processing for reception signals having different frequencies.

According to the present invention, firstly, the radar apparatus which can make an accurate short-distance measurement by delaying a signal which becomes a base of generation of a transmission pulse and by performing a gate operation for a reception signal, and whose noise bandwidth is restricted by cutting a signal in a narrow band filter with an AM signal can be provided.

Secondly, the frequencies of the signal which becomes the base of generation of a transmission pulse, and the signal which becomes a reference of the gate operation for a reception signal are varied, so that the influence of noise caused by the gate operation can be removed, and even a pulse radar apparatus which uses an FM modulation signal can obtain data of on the order of 1 to several cycles of a beat signal regardless of a distance to a target, so that the S/N ratio is improved and also the detection accuracy of the target can be improved.

Thirdly, the phase difference between the output signal of the gate circuit and a local signal input to a mixer in a stage succeeding the gate circuit is implemented as 0, whereby 2 systems of A/D converters and filters for can be reduced to one system in the case of I-Q detection, whereby cost reduction and facilitation of signal processing can be implemented.

Hereinafter, preferred embodiments according to the present invention are described. Prior to descriptions of embodiments 1 to 4 of the pulse radar apparatus according to the present invention, a pulse radar apparatus which becomes a base of these embodiments, namely, a pulse radar apparatus which is based on an ASK (Amplitude Shift Keying) method performing amplitude modulation for a sinusoidal wave (continuous wave) signal as a carrier wave is summarized.

Figure 4:
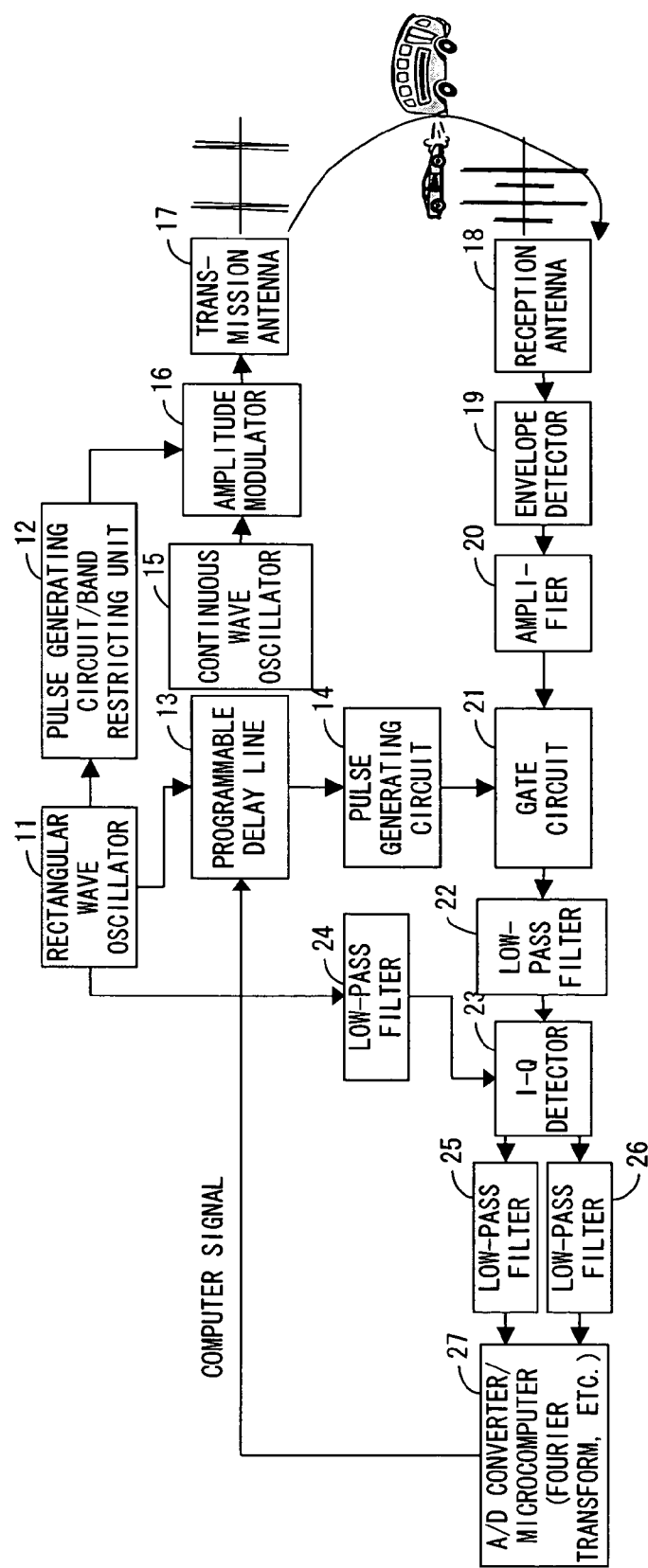
FIG. 4 is a block diagram showing the configuration of a pulse radar apparatus of an ASK method.
Figure 5:
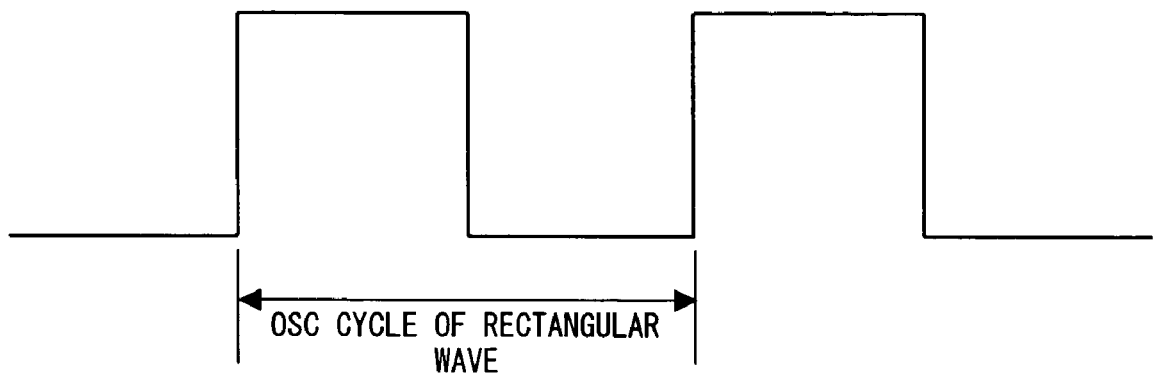
FIG. 5 shows the output of a rectangular wave oscillator shown in FIG. 4.

FIG. 4 is a block diagram showing the configuration of the pulse radar apparatus of the ASK method which becomes the base of the embodiments of the present invention as described above. Operations of this apparatus are described with reference to waveforms of respective units shown in FIGS. 5 to 16. Firstly, a rectangular wave oscillator 11 shown in FIG. 4 oscillates a rectangular wave shown in FIG. 5. Assume that the duty ratio and the frequency of the rectangular wave are respectively 50%, and 10 MHz.

A pulse generating circuit/band restricting unit 12 generates a pulse which is the same in frequency and smaller in duty ratio as compared with the rectangular wave, namely, a pulse having a narrow width shown in FIG. 6A in synchronization with the rising edge, for example, of the rectangular wave generated by the rectangular wave oscillator 11, and band-restricts the pulse so as to comply with laws and regulations as shown in FIG. 6B.

The width of the pulse shown in FIG. 6A is fundamentally determined by a distance resolution required for the pulse radar. Supposing that the required resolution (minimum distance) is a, and the pulse width is $_pW$, a round-trip distance of the radio wave results in 2×a, and the pulse width $_pW$ is given by the following equation if the velocity of light is defined to be c.

$$_pW = 2 \times a/c \qquad (1)$$

Also supposing a=0.3 m, $_pW$ results in 2 ns.

By way of example, for a radar mounted in a car in Japan, a bandwidth in the vicinity of 76 GHz is used. By law, 500 MHz per channel can be exclusively used in a bandwidth of 76 to 77 GHz. If the width of a pulse is 2 ns, the width of a mainlobe is 500 MHz. However, since the width of a sidelobe is equal to or wider than the width of the mainlobe, it must be attenuated. Accordingly, the bandwidth must be restricted.

Figure 7:
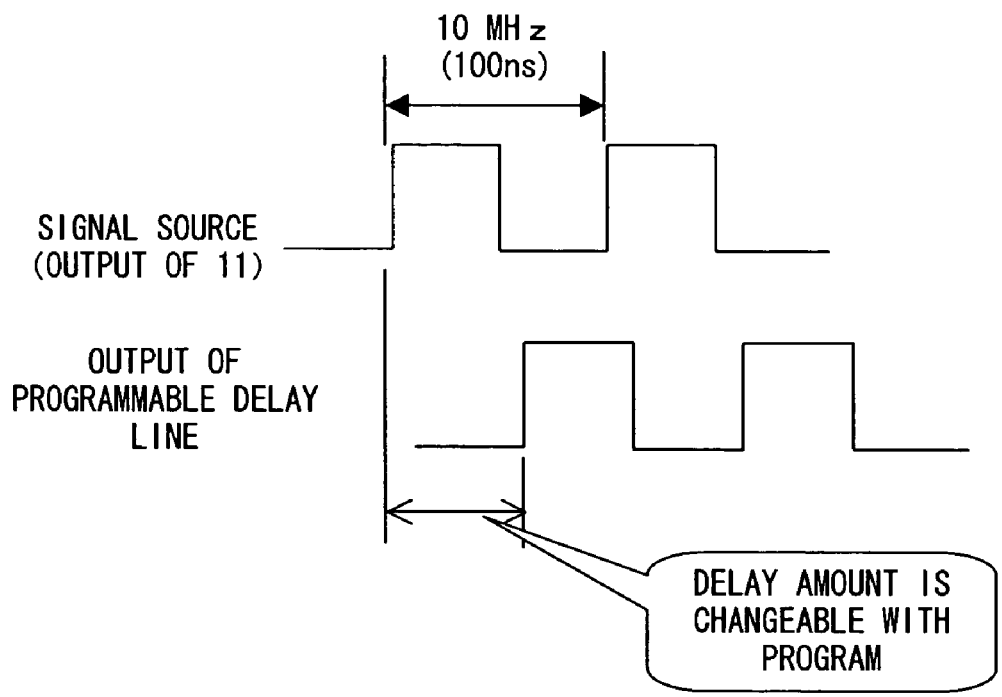
FIG. 7 shows the output of a programmable delay line.

A programmable delay line 13 shown in FIG. 4 delays the rectangular wave generated by the rectangular wave oscillator 11 as shown in FIG. 7 in response to a signal from a computer, by way of example, a signal that can be shifted in units of 1 ns in a range of 0 to 100 ns. This delay range and the shift amount may vary by requirement. Also the direction of the delay shift may vary by requirement. For example, if it is not known which target exists where, the delay time must be swept. However, if tracking is made for a car the position of which is detected beforehand, it is sufficient to search only the vicinity of the delay time which corresponds to the distance, and the delay amount can be controlled according to the contents of a requirement.

Figure 8:
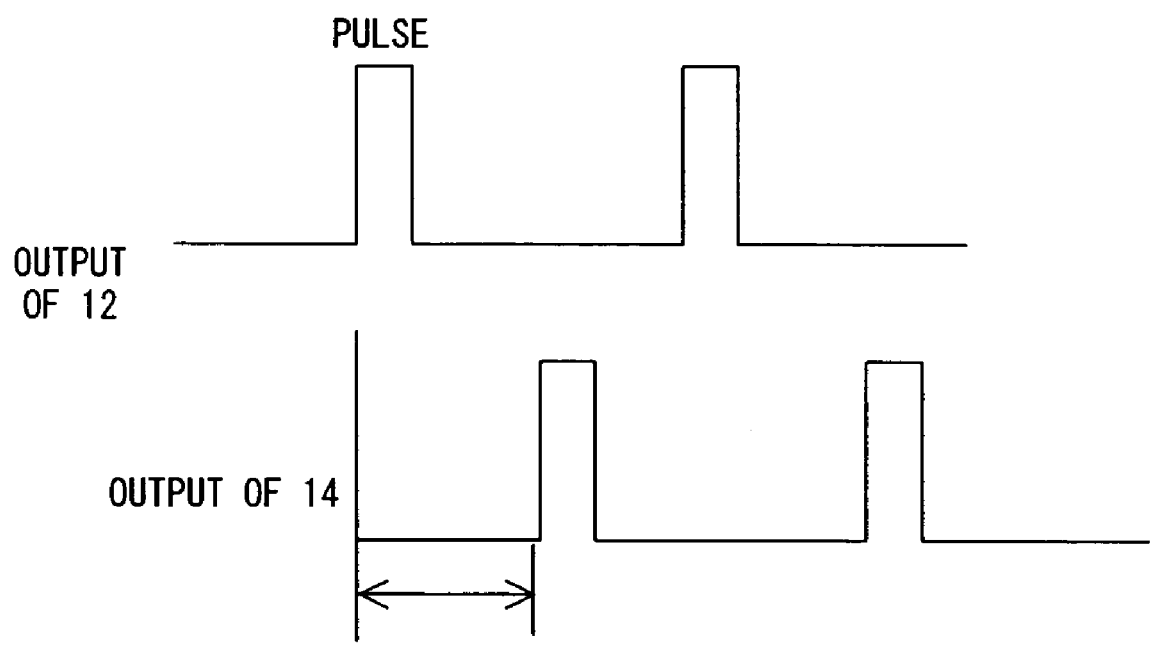
FIG. 8 shows an output after the output of the programmable delay line passes through the pulse generating circuit.

The pulse generating circuit 14 generates a pulse whose frequency is the same as the rectangular wave, whose duty ratio is small, and whose rising edges matches the rising edges of the rectangular wave delayed by the programmable delay line 13, and having a frequency of 10 MHz and a duty ratio of 50%, for example. This pulse is a pulse that is delayed by the delay time generated by the programmable delay line 13 relative to the output of the pulse generating circuit/band restricting unit 12 as shown in FIG. 8.

The output (continuous wave) of a continuous wave oscillator 15 is shown in FIGS. 9A and 9B. This continuous wave is a sinusoidal wave shown in FIG. 9A, and its frequency is composed of a single component as shown in FIG. 9B.

The output of the continuous wave oscillator 15 is amplitude-modulated by the amplitude modulator 16 by using the pulse output from the pulse generating circuit/band restricting unit 12. The output is conceptually shown in FIGS. 10A and 10B.

Figure 10A:
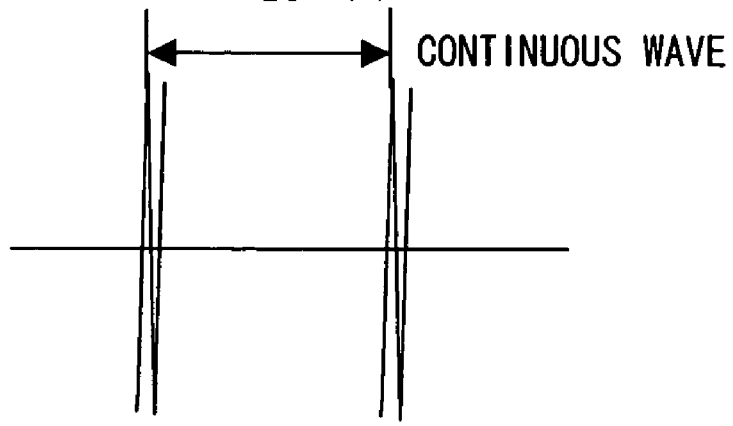
FIG. 10A is a schematic (No. 1) explaining the output of an amplitude modulator.
Figure 10B:
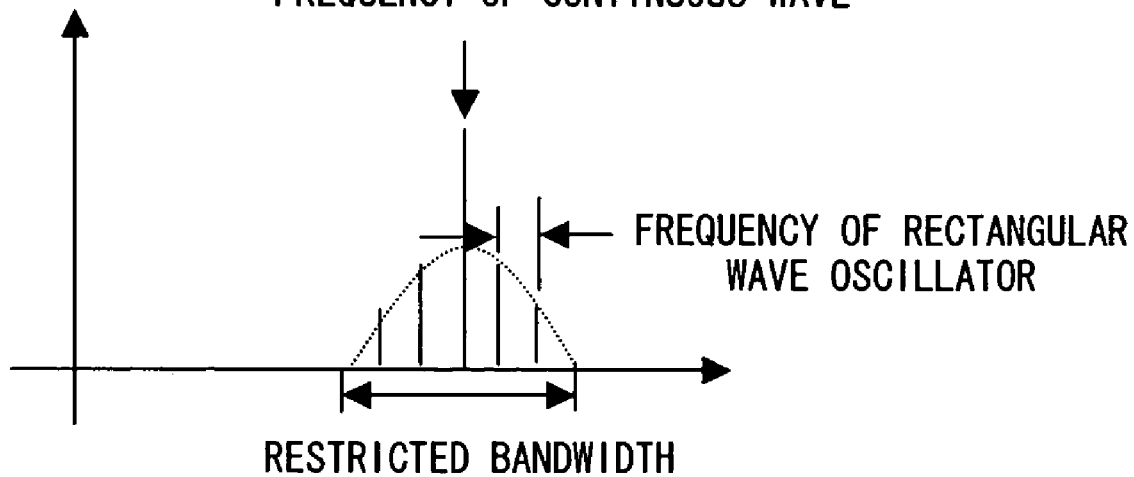
FIG. 10B is a schematic (No. 2) explaining the output of the amplitude modulator.

FIG. 10A shows the output of the amplitude modulator 16, and conceptually shows that the continuous wave of FIG. 9A is output only while the pulse as the waveform of FIG. 6A is held HIGH. FIG. 10B shows the waveform of a frequency region of this output, which has a bandwidth restricted with the frequency of the continuous wave centered.

The output of the amplitude modulator 16 is transmitted by a transmission antenna 17 to a side of a target to be detected by the radar, and respectively reflected by two cars in this example and received by the reception antenna 18 of the pulse radar apparatus.

An upper part of FIG. 11 shows waveforms input to the reception antenna 18. Among these waveforms, a waveform whose amplitude is small and a waveform whose amplitude is large show the waves reflected from the small car that exists nearer and the car that exists farther, respectively.

The reception pulses received by the reception antenna 18 are envelope-detected by a detector 19. A lower part of FIG. 11 explains a waveform output from the detector 19. As shown in this part, the reflection signals from the two cars, which are received by the reception antenna 18, are output as two pairs of pulses whose amplitudes are different as shown in the lower part by being envelope-detected. Intervals of the output pulses are depicted wider than those of the signals received by the reception antenna 18.

The output of the detector 19 is given to the gate circuit 21 after being amplified by an amplifier 20. To the gate circuit 21, the output of the pulse generating circuit 14, namely, the pulse that is delayed by the programmable delay line 13 and described with reference to FIG. 8 is input. The gate circuit 21 performs a gate operation for the output of the amplifier 20 by using the output of the pulse generating circuit 14 as a control signal.

With this gate operation, a portion other than a corresponding reception pulse can be cut and a target can be accurately detected, even if the width of a transmission pulse is small, and a noise influence is high.

Figure 12:
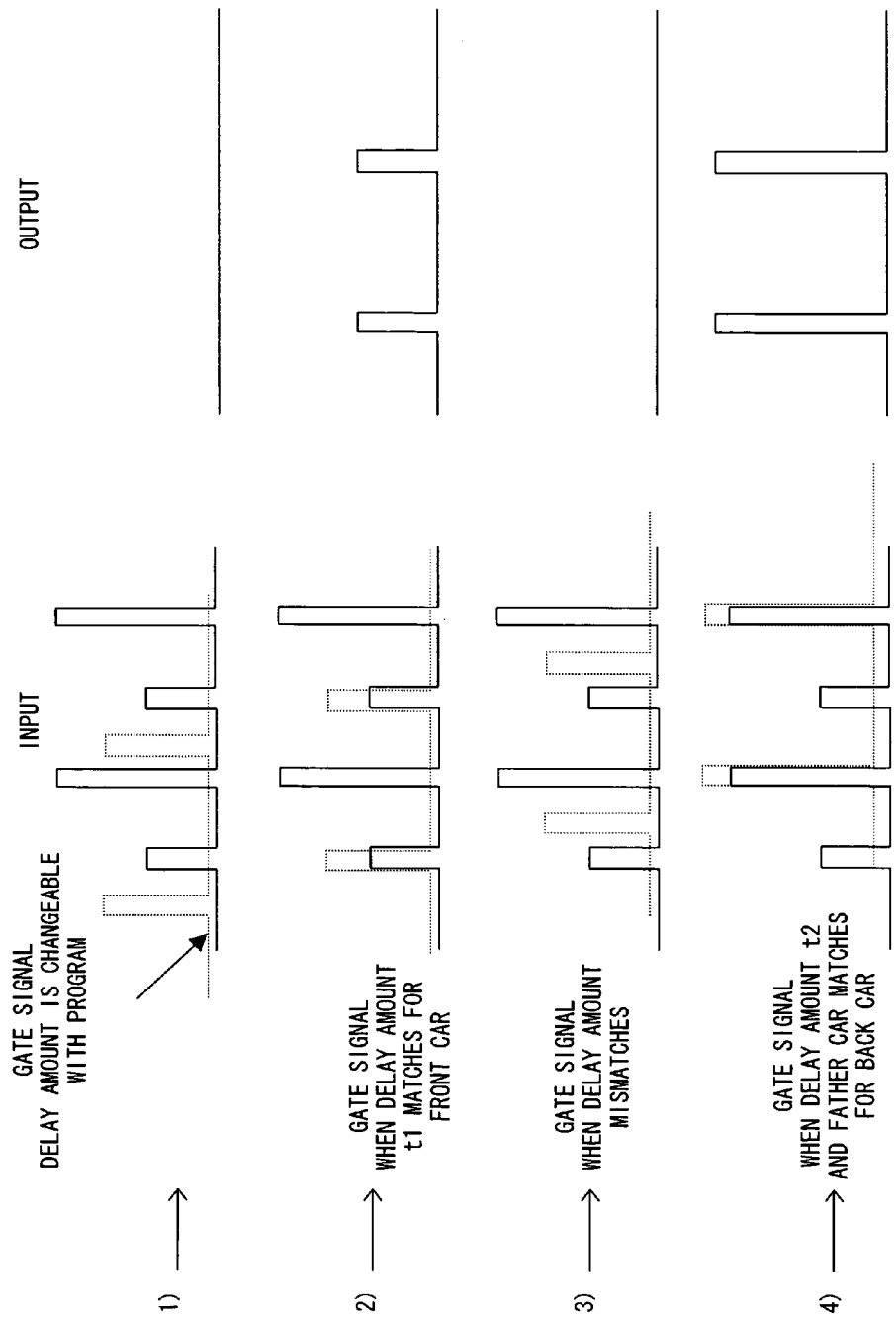
FIG. 12 explains the operations of a gate circuit.

FIG. 12 explains the operations of the gate circuit 21. The left side of FIG. 12 shows a solid-line waveform which indicates the output of the amplifier 20 as an input to the gate circuit 21, and a dotted-line waveform which indicates the output of the pulse generating circuit 14 as a gate signal for control, whereas the right side of FIG. 12 shows the output of the gate circuit 21.

In a part indicated by 1) in FIG. 12, the delay amount of the gate signal is small, and a gate pulse does not match any of input pulses in terms of time, so that the output of the gate circuit 21 fundamentally becomes 0. In a part indicated by 2), the pulse of the gate signal matches in time t1 of a pulse which corresponds to the waveform reflected from the nearer car in FIG. 4, so that this pulse is obtained as an output. In a part indicated by 3), the delay amount is almost intermediate, so that the output becomes 0 similarly to the case of the part indicated by 1). In a part indicated by 4), a delay amount t2 matches the time of the pulse reflected from the farther car, so that this pulse is output.

Figure 13:
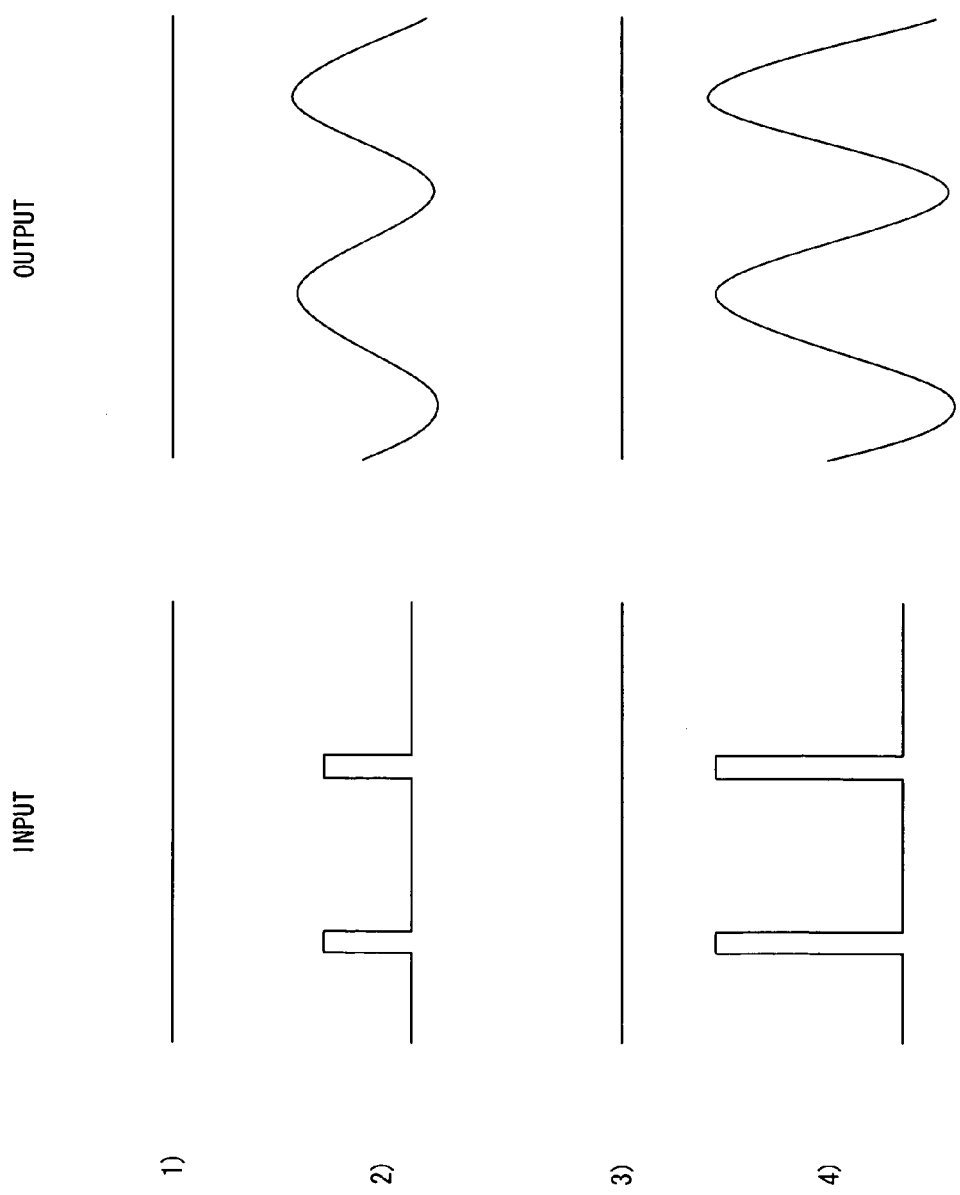
FIG. 13 shows the output of a low-pass filter to which the output of the gate circuit is input.

FIG. 13 explains an input/output to/from the low-pass filter 22. This filter passes a frequency component of 10 MHz or lower as a base wave of the output of the rectangular wave oscillator 11. Outputs which correspond to the parts indicated by 1) and 3) of FIG. 12 fundamentally become 0, and outputs which correspond to the parts indicated by 2) and 4) become sinusoidal waves. The amplitude and the phase of each of the sinusoidal waves correspond to the size and the position of an input pulse.

The output of the low-pass filter 22 is given to the I-Q detector 23. To the I-Q detector 23, also the output of the rectangular wave oscillator 11 is input via the low-pass filter 24. As described above, these two low-pass filters 22 and 24 pass a base wave which is the output of the rectangular wave oscillator 11, and, 10 MHz in frequency. The I-Q performs 23 makes I-Q detection for the output of the low-pass filter 22 with reference to the output of the low-pass filter 24, namely, a sinusoidal wave as the base wave of the output of the rectangular wave oscillator 11, and outputs an I (synchronous) component and a Q (orthogonal) component.

Figure 14:
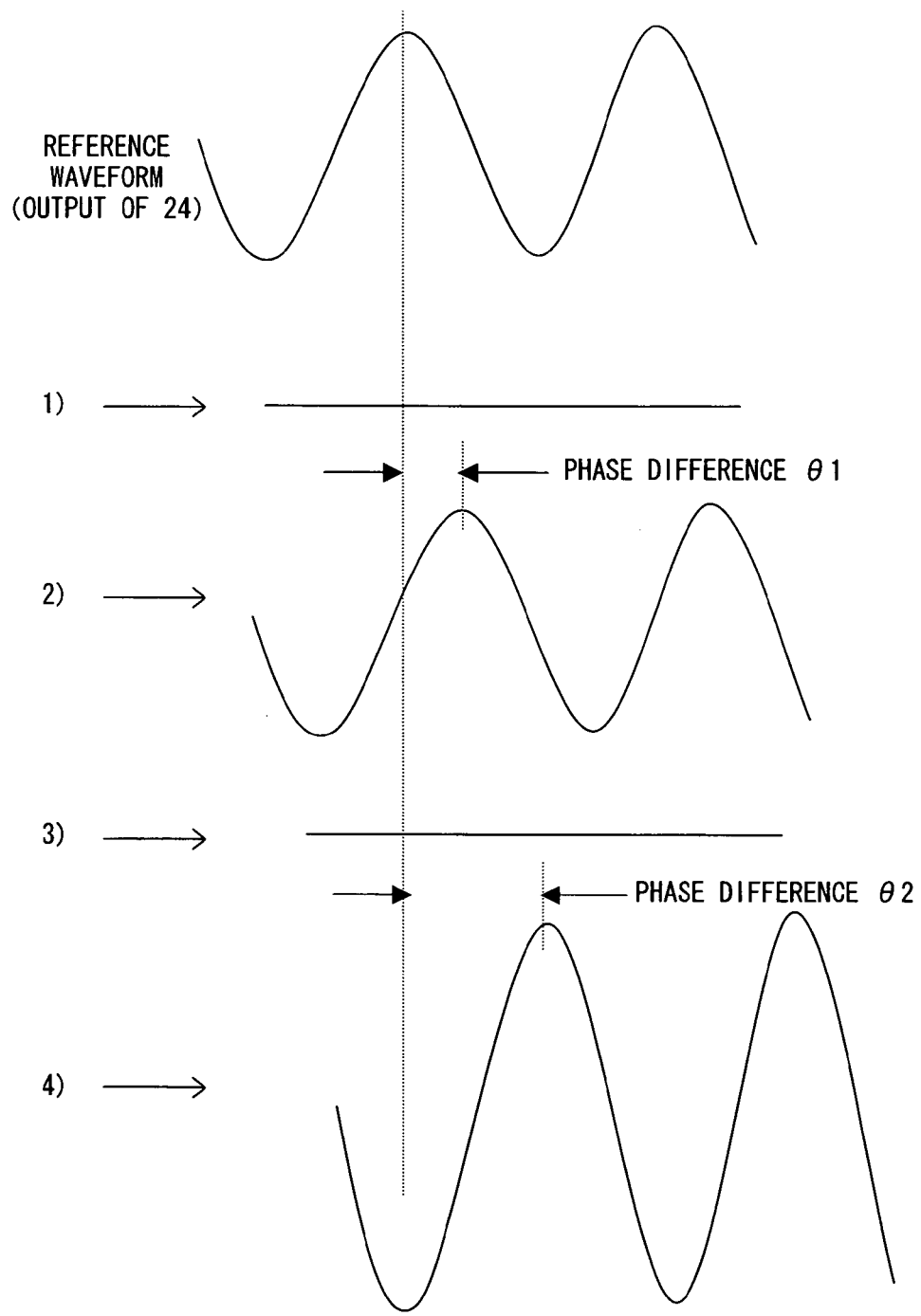
FIG. 14 explains the output of an I-Q detector.

FIG. 14 explains the operations of the I-Q detector 23. In this figure, the topmost waveform indicates the output of the low-pass filter 24, namely, a waveform that becomes a reference. A part indicated by 1) corresponds to that of FIG. 13. In this part, both of the I and Q outputs become 0 since the output of the low-pass filter 22 is 0. A part indicated by 2) indicates an output which corresponds to the reflection wave from the above described nearer car. In this stage, a phase difference θ1 between the I and Q signals and the reference signal corresponds to the distance to the nearer car, and the amplitude corresponds to the intensity of reception of the reflection wave.

A part indicated by 3) corresponds to the case where the delay amount is intermediate. In this part, both of the I and Q outputs become 0. A part indicated by 4) corresponds to the reflection wave from the farther car. A phase difference θ2 between the I and Q outputs and the reference signal corresponds to the distance to the farther car, and the amplitude corresponds to the intensity of reception of the reflection wave. Therefore, the amplitude becomes larger than that in case of the part 2).

In this preferred embodiment, two types of methods are used to obtain a distance to a target by using the I and the Q components as the outputs of the I-Q detector. A calculation of this distance is made by the A/D converter/microcomputer (MC) 27 with the use of the I and the Q components as the outputs of the I-Q detector 23 via the two low-pass filters 25 and 26. These two low-pass filters 25 and 26 are low-pass filters, which are inserted before the A/D converter and generally used for a half of a sampling frequency.

In a first method obtaining the distance to a target, a value of $(I^2+Q^2)$, which corresponds to the amplitude, is obtained from the I and the Q components as the outputs of the low-pass filters 25 and 26. The delay time, which is generated by the programmable delay line 13 shown in FIG. 4A, is changed, and a time during which a radio wave is reflected from a target and returns is determined at a time point when the value of $(I^2+Q^2)$ becomes the maximum, so that the distance to the target is obtained. This first method is used, for example, in the case where a pulse width is short and signal power is low.

Figure 15:
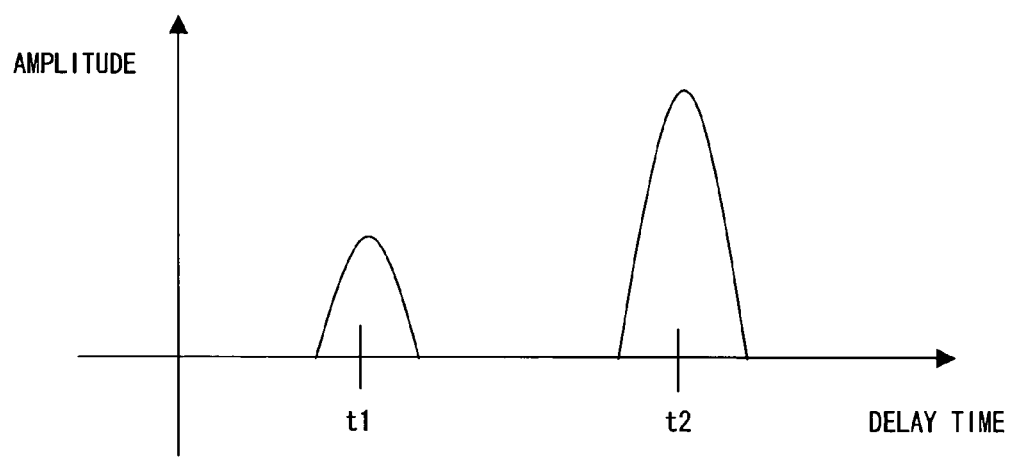
FIG. 15 shows the relationship between an amplitude that corresponds to the output of the I-Q detector and a delay time of a delay line.

FIG. 15 explains the relationship between the delay time and the amplitude. In this figure, the amplitude becomes the maximum at the time t1 which corresponds to the round-trip time of the radio wave to the nearer car and is described with reference to FIG. 4, and at the time t2 of the round-trip time of the radio wave to the large car.

With a second method obtaining a distance to a target, the distance to the target is obtained by using the phase differences obtained from the I and the Q components, namely, the phase differences θ1 and θ2, which are described with reference to FIG. 14. This second method is used, for example, in the case where the signal power is relatively high.

The phase difference θ, the delay time τ, and the distance D to a target are given by the following equations with the use of the I and the Q components, a repetitive cycle T (100 ns) of the same transmission pulse as the output of the rectangular wave oscillator 11, and the velocity of light c.

$$\theta = \tan^{-1}(Q/I) \quad (2)$$

$$\tau = \theta T/2\pi \quad (3)$$

$$D = \tau \times c/2 = \theta Tc/4\pi \quad (4)$$

FIG. 16 shows the relationship between the delay time generated by the programmable delay line 13 and the phase difference, similar to FIG. 15. Delay times t1 and t2 respectively correspond to the phase differences θ1 and θ2, which are described with reference to FIG. 14.

Here, it is assumed that the processing is executed with software by the microcomputer after the I and the Q components which are output from the I-Q detector are digitized in order to obtain the distance to a target. However, the phases and the distance can be calculated also with an analog circuit as a matter of course. Since the signal is cut to 10 MHz or lower by the low-pass filter as described above, a general LSI, etc. can be used.

Figure 17:
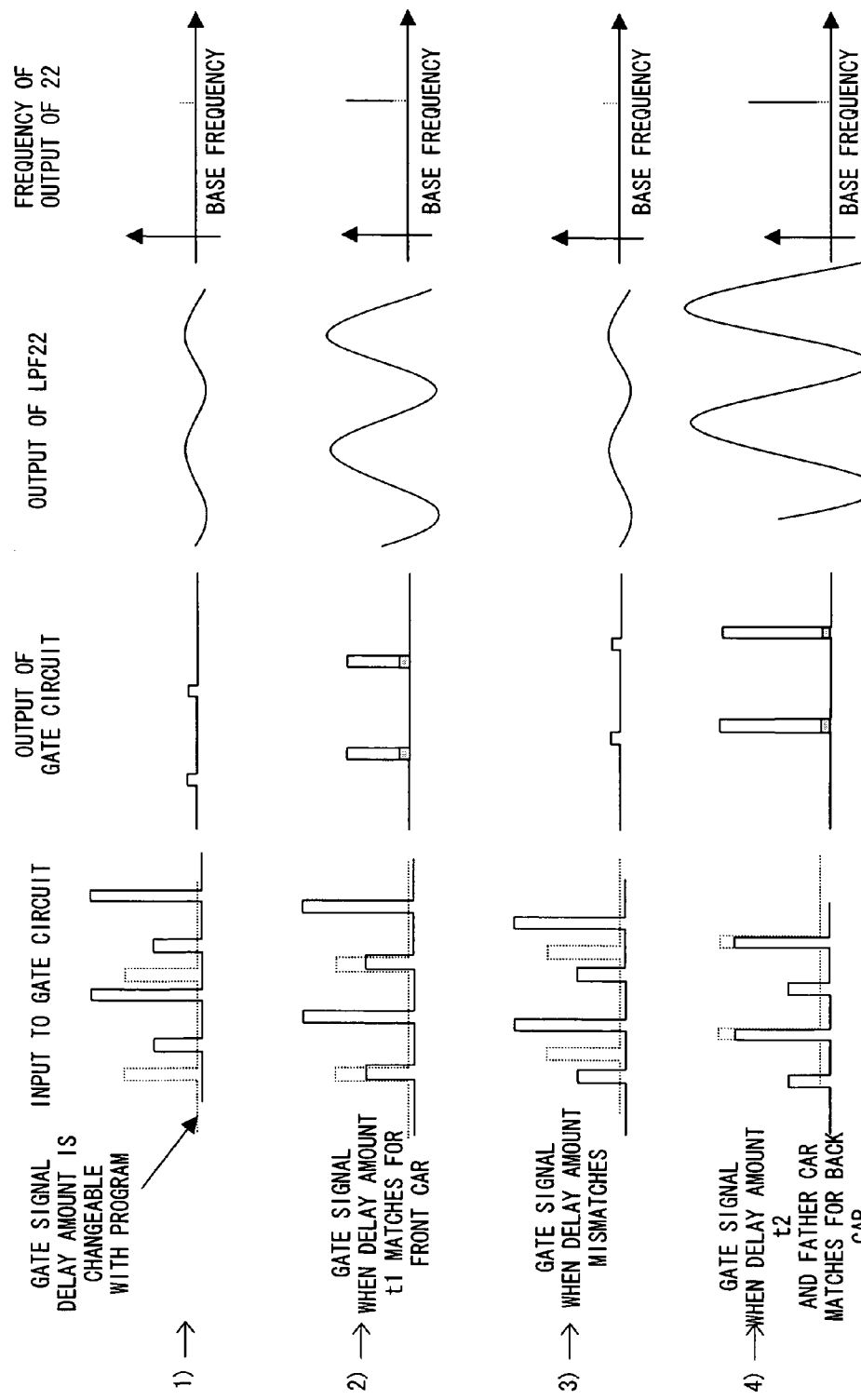
FIG. 17 explains an influence exerted when a leak exists in the gate circuit.

FIG. 17 explains the influence of noise caused by a leak of the gate circuit in the gate operation of the gate circuit 21 of the pulse radar apparatus shown in FIG. 4. This figure shows the inputs/outputs to/from the gate circuit 21, and the output waveform and the frequency of the low-pass filter (LPF) 22. Meanings of parts indicated by 1) to 4) are similar to those in FIG. 12.

In the part indicated by 1), an output caused by a leak of the gate circuit 21 or the like, namely, noise is output even if the input to the gate circuit 21 and the gate pulse mismatch. Although this noise is considered to have a more complex waveform, it is represented as a small pulse here. The frequency of the output of the low-pass filter 22 is the base frequency as the oscillation frequency of the rectangular wave oscillator 11 shown in FIG. 4.

In the part indicated by 2), a pulse as the reflection signal, and the noise described in the part indicated by 1) are superposed and output from the gate circuit 21 if the reflection signal from the nearer car and the gate pulse match. At this time, the frequency of the output of the low-pass filter 22 is only the base frequency similar to the part indicated by 1).

In the part indicated by 3), only the noise is output from the gate circuit 21 similar to the stage indicated by 1). In the part indicated by 4), the reflection signal from the farther car and the noise are superposed and output from the gate circuit 21.

Removing the influence of the noise caused by the leak is one of the objects of the present invention. If the size of a reflection signal becomes smaller, it cannot be distinguished from the noise, and the detection accuracy of a target is deteriorated. Also a method storing a leak amount and taking a difference is considered as one method removing the influence of noise. However, since the leak amount may drift with a temperature, noise sometimes increases on the contrary. Therefore, the present invention adopts another method.

Embodiments of the pulse radar apparatus according to the present invention are described next. FIG. 18 is a block diagram showing the configuration of the pulse radar apparatus as an embodiment 1. Comparing with the configuration of the pulse radar apparatus shown in FIG. 4, a difference fundamentally exists in a point that a frequency divider 30 is provided between the rectangular wave oscillator 11 and the pulse generation circuit/band restricting unit 12, and an input to a low-pass filter 32, which corresponds to the low-pass filter 24, is given not from the rectangular wave oscillator 11 but from the frequency divider 30. Note that the amplifier 20 between the envelope detector 19 and the gate circuit 21 is omitted.

Additionally, the low-pass filters 31 and 32 respectively correspond to the low-pass filters 22 and 24 shown in FIG. 4. The two low-pass filters 22 and 24 pass the base frequency of the rectangular wave signal generated by the rectangular wave oscillator 11 in FIG. 4, whereas the two low-pass filters 31 and 32 in FIG. 18 pass the base frequency of a rectangular wave signal generated by the frequency divider 30.

A first signal generating unit, a second signal generating unit, a control pulse generating unit, and a gate unit in claim 1 of the present invention respectively correspond to the frequency divider 30, the rectangular wave oscillator 11, the programmable delay line 13 and the pulse generating circuit 14, and the gate circuit 21. A detecting unit and a distance calculating unit in claim 2 respectively correspond to the I-Q detector 23, and the A/D converter/microcomputer 27.

Figure 19:
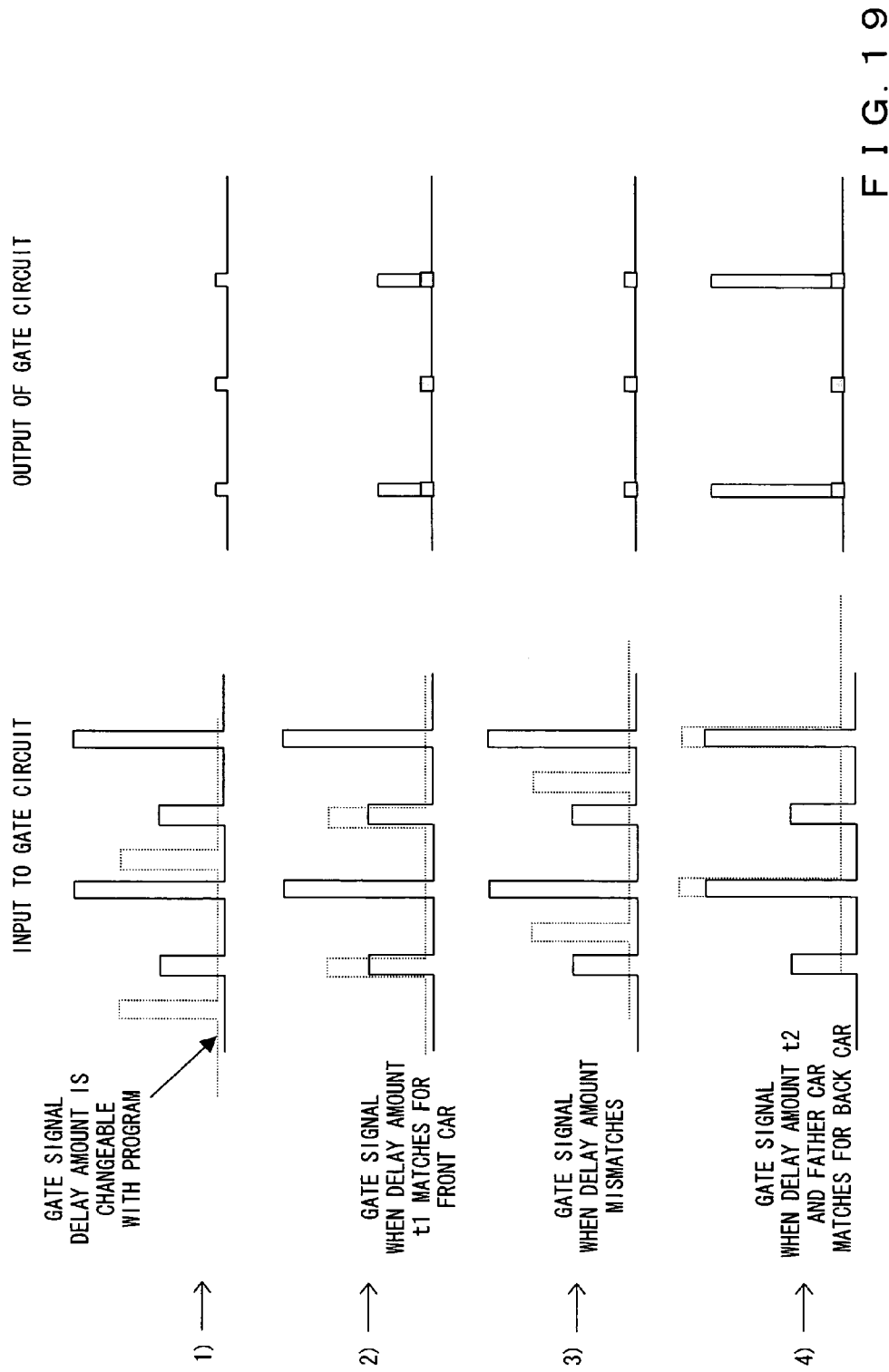
FIG. 19 is a schematic (No. 1) explaining the influence of a leak in a gate circuit in the embodiment 1.

FIG. 19 explains inputs/outputs to/from the gate circuit 21 in the embodiment 1. The inputs/outputs are described by comparing with FIG. 17. In a part indicated by 1) of FIG. 19, the output of the gate circuit 21 is only its leak component, namely, noise. Its base frequency is the base frequency of the output signal of the rectangular wave oscillator 11, and referred to as a reception system frequency here. For example, the frequency is 10 MHz.

In the meantime, in a part indicated by 2), if the gate pulse and the reflection signal from the nearer car match, the reflection signal is superposed on the noise similar to the part indicated by 2) of FIG. 17. The reflection signal, namely, the frequency of the reception signal is determined by the base frequency of the frequency divider 30, for example, 5 MHz. Here, this frequency is referred to as a transmission system frequency.

Figure 20:
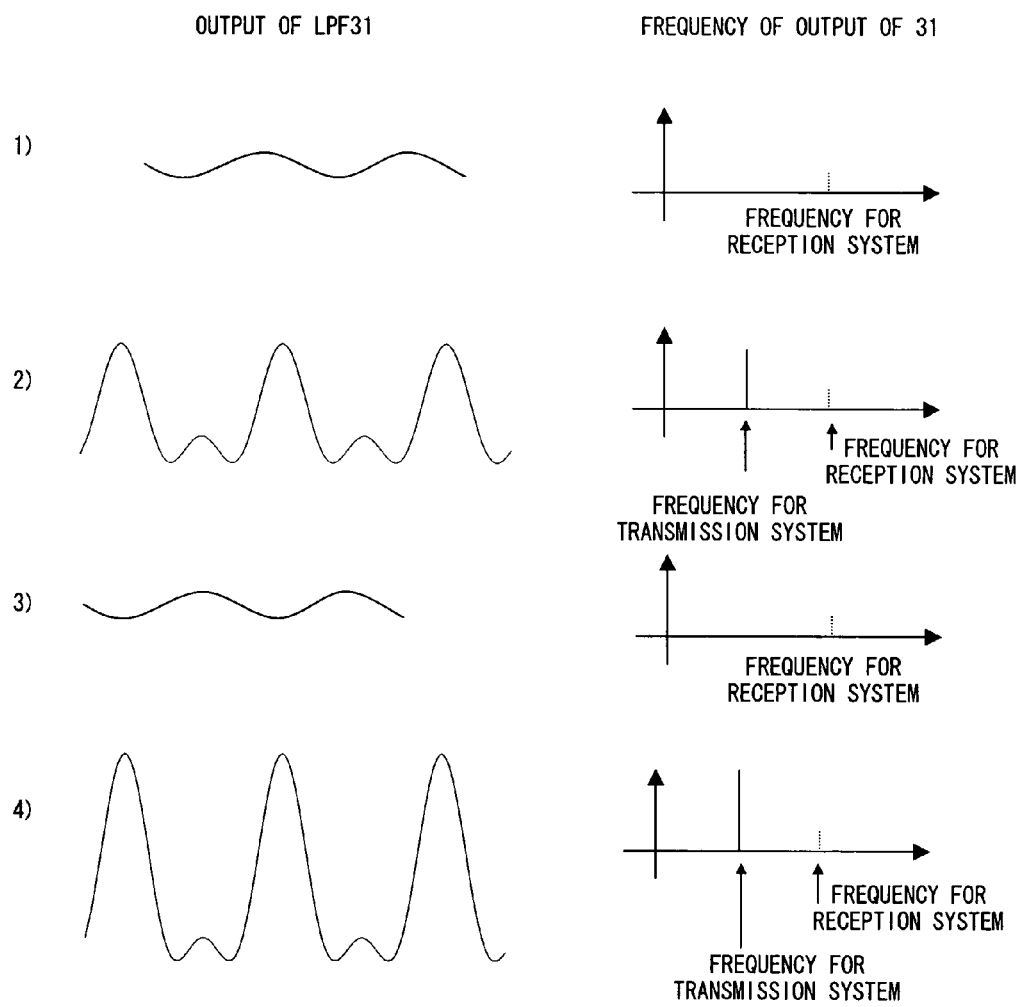
FIG. 20 is a schematic (No. 2) explaining the influence of the leak in the gate circuit in the embodiment 1.

FIG. 20 explains the output of the low-pass filter (LPF) 31. As shown in this figure, a reception signal component having a transmission system frequency is generally larger in comparison with a noise component having a reception system frequency. FIG. 21 explains a combined component in the output waveform of the gate circuit 21, which component is obtained by superposition, namely, a combination of the components described in FIG. 20. In this figure, the amplitude of the leak of the gate circuit is rather close to that of the reception signal. This emphasizes the effect of the combination. Generally, the amplitude of the reception signal is relatively larger than the leak of the gate circuit, and the combined signal becomes, for example, as shown in part 4) of FIG. 20.

The low-pass filter (LPF) 31 in the stage succeeding the gate circuit 21 in FIG. 18 passes the base frequency, for example, 5 MHz of the output of the frequency divider 30. With such a filter, however, the component of 10 MHz as the base frequency of the output of the rectangular wave oscillator 11 is generally attenuated, for example, by approximately 6 dB, and a leak component remains in the output of the LPF 31 as shown in FIG. 20. However, since the signal of the base frequency of the output of the frequency divider 30 is given to the I-Q detector 23 in the succeeding stage as a local signal, a noise component caused by the leak of the gate circuit is not included in the I and the Q components output from the I-Q detector 23.

In the embodiment 1 of FIG. 18, the frequency (transmission system frequency) of the output signal of the frequency divider 30 is assumed to be 5 MHz, for example, and the output frequency (reception system frequency) of the rectangular wave oscillator is assumed to be 10 MHz. Fundamentally, however, any of these two frequencies may be higher. If one of the two frequencies is a multiple (or a submultiple) of the other, and if the time point when the phase angle is 0 intermittently matches like the frequency division relationship, the multiple may be an even or an odd number.

However, since a measurement range of the distance to the target is limited by the reception system frequency, and the power of the reception signal becomes low if transmission pulses are reduced, the frequency of the transmission system 5 MHz and that of the reception system 10 MHz, which are used here, are suitable examples here.

If the frequency of the reception system is made higher than that of the transmission frequency, for example, a suitable band-pass filter must be used as a replacement for the low-pass filter in the stage succeeding the gate circuit 21 shown in FIG. 18 in order to pass the transmission system frequency.

An embodiment 2 of the pulse radar apparatus according to the present invention is described next. In the pulse radar apparatus shown in FIG. 4, and the embodiment 1 shown in FIG. 18, the I-Q detector is provided after the low-pass filter in the stage succeeding the gate circuit 21, and the I-Q detection is made by using the local signal. As a result, the I and the Q components are obtained, and data processing is respectively executed for the two components by using the low-pass filter and the A/D converter. In the embodiment 2, a mixer is used as a replacement for the I-Q detector in order to reduce the number of systems of the low-pass filters and the A/D converter to one in order to reduce the cost.

In the embodiment 1 shown in FIG. 18 (also in FIG. 4), a phase difference exists between the two input signals to the I-Q detector 23 as described with reference to FIG. 14, and the phase difference becomes null if the mixer is used as a replacement for the I-Q detector. Therefore, the number of systems of the low-pass filters and the A/D converter cannot be reduced to one.

This phase difference is generated as follows: the reference waveform output from the low-pass filter 32 does not delay the output of the frequency divider 30, although the output of the gate circuit 21 is delayed by the operations of the programmable delay line 13 in FIG. 18. Accordingly, in the embodiment 2 of FIG. 22, the input to the low-pass filter 24 which outputs a local signal given to the mixer 33 is given from the programmable delay line 13, whereby the phase difference between the output of the gate circuit 21 and the local signal given to the mixer 33 becomes 0. Accordingly, the mixer 33 can be used as a replacement for the I-Q detector, and the number of systems of low-pass filters and A/D converter for that output (I component) can be reduced to one.

A signal delaying unit a control pulse generating unit, and a reflection signal detecting unit in claim 3 respectively correspond to the programmable delay line 13, the pulse generating circuit 14, and the mixer 33.

The number of systems of low-pass filters and an A/D converter can be reduced to one by using the mixer as a replacement for the I-Q detector in the embodiment 2 as described above, whereby a fine adjustment for matching the characteristics of analog circuits, and signal processing by the microcomputer in the case of the two systems can be facilitated in addition to the advantage that the cost can be reduced in comparison with the case of the two systems. For example, a calculation of the sum of the squares of the I and the Q components (which is a heavy load to a single chip microcomputer) and the like are required to obtain the amplitude of a reception signal. However, only the I component is used, whereby such a calculation becomes unnecessary.

Figure 22:
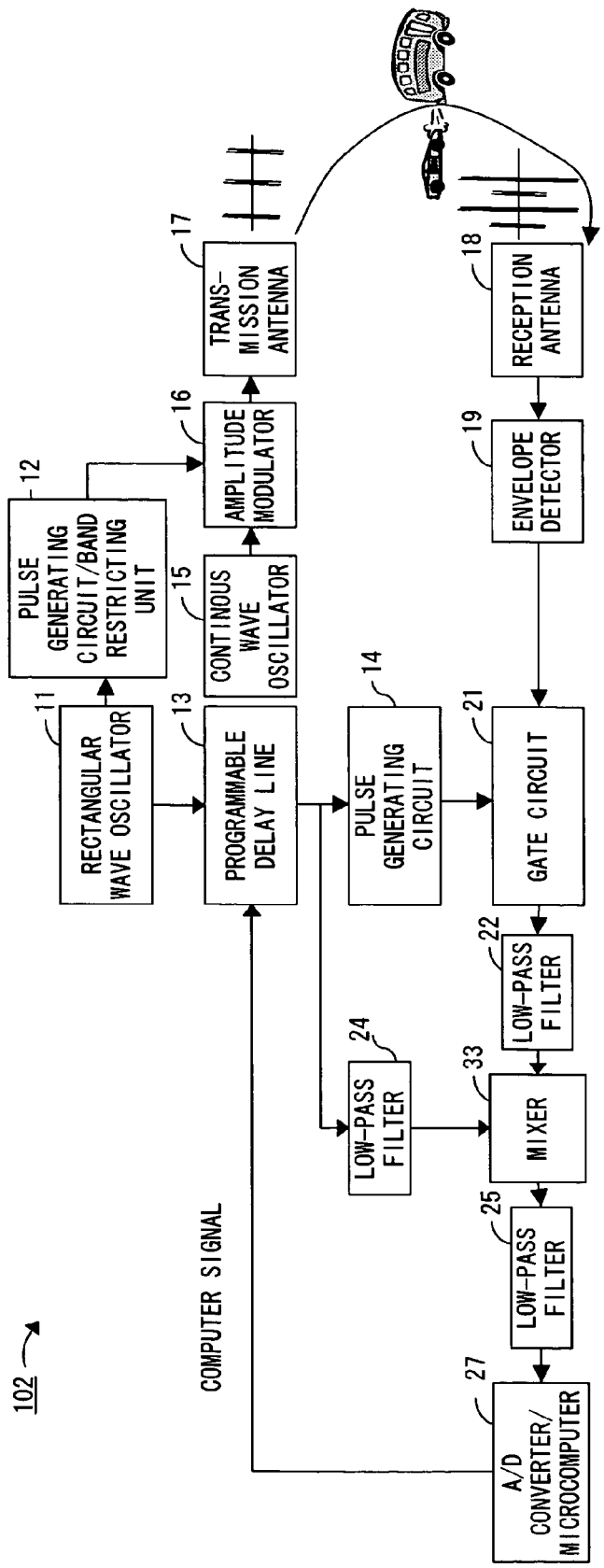
FIG. 22 is a block diagram showing the configuration of an embodiment 2 of the pulse radar apparatus according to the invention.
Figure 23:
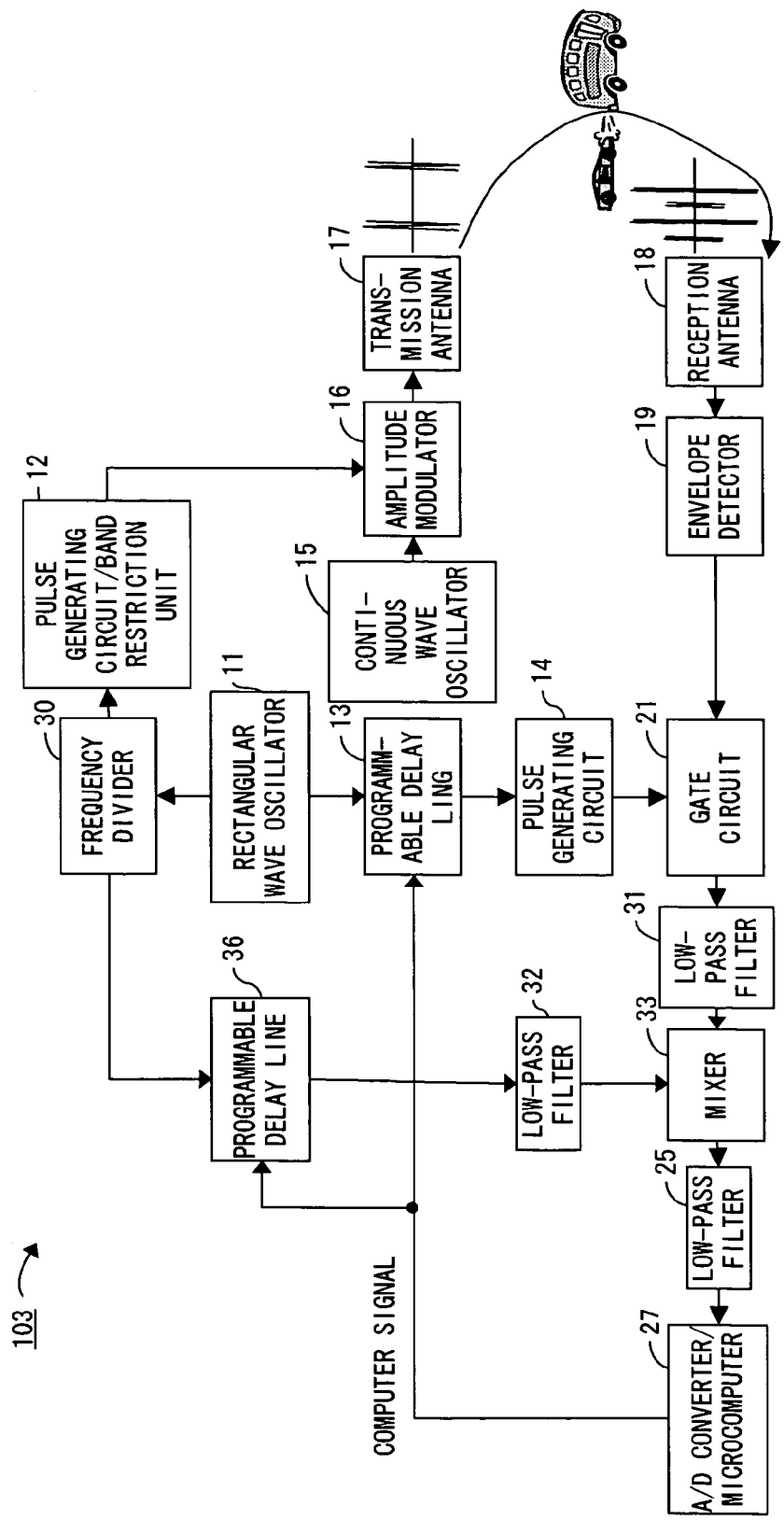
FIG. 23 is a block diagram showing the configuration of an embodiment 3 of the pulse radar apparatus according to the invention.

FIG. 23 is a block diagram showing the configuration of an embodiment 3 of the pulse radar apparatus according to the present invention. In the above described embodiment 2 shown in FIG. 22, the influence of the noise caused by the leak of the gate circuit 21, which is described in the embodiment 1, cannot be removed, because the frequency divider 30 is not used in the above described embodiment 2 shown in FIG. 22, unlike the embodiment 1.

In the embodiment 3 shown in FIG. 23, the frequency divider 30 is used in a similar manner as in the embodiment 1, low-pass filters 31 and 32, which pass the base frequency of the frequency divider 30, are used in a similar manner as in FIG. 4, but a difference exists in a point that an output of a programmable delay line 36, which causes the output signal of the frequency divider 30 to delay by the amount which is the same as the delay amount generated by the programmable delay line 13, is given to the input to the low-pass filter 32. As a result, the base wave component of the output signal of the frequency divider 30 is given, and the I component is output from the mixer 33 as two input signals to the mixer 33, unlike the embodiment 2 shown in FIG. 22.

Note that a signal delaying unit in claim 4 corresponds to the programmable delay line 36.

Figure 24:
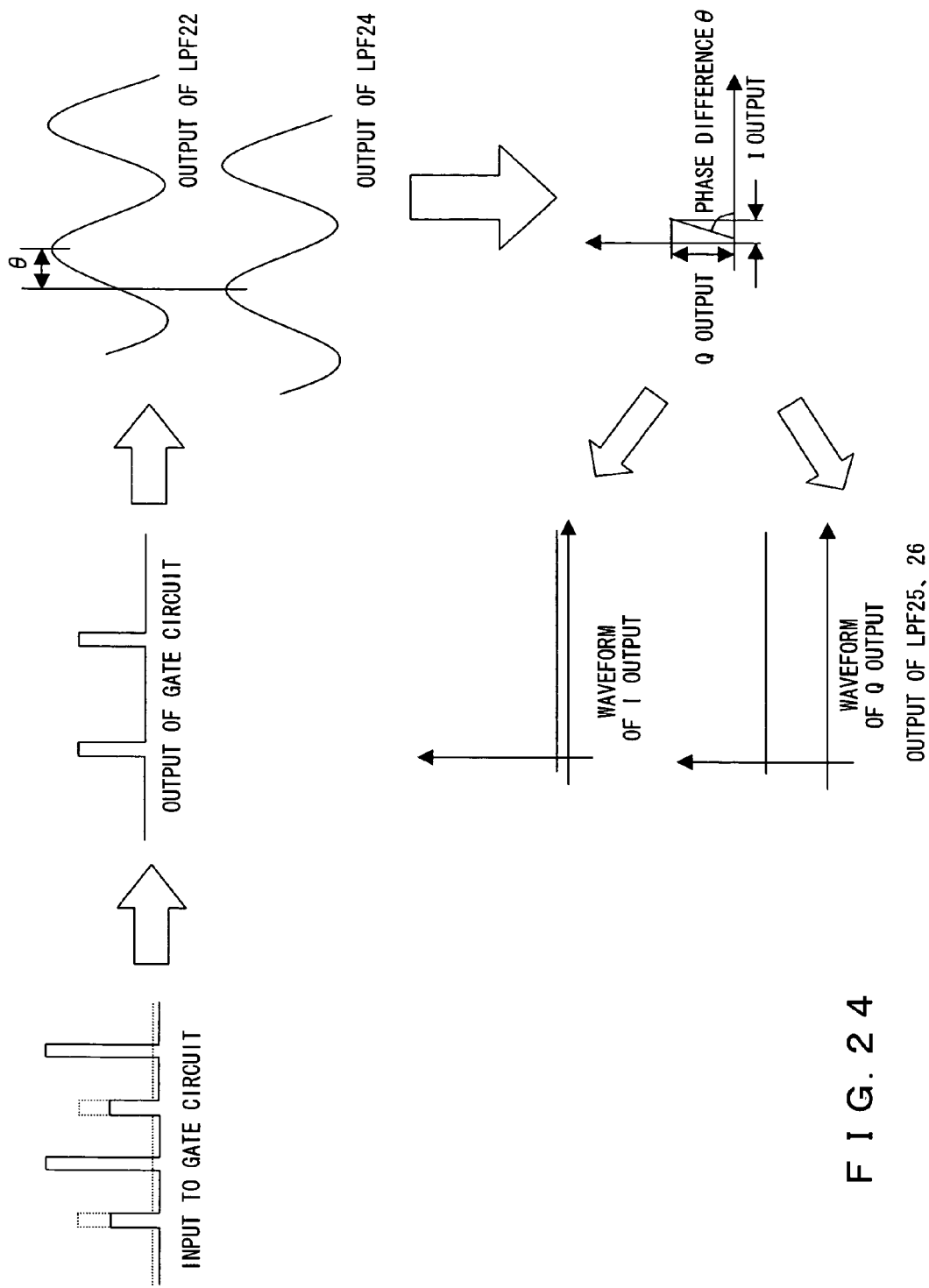
FIG. 24 explains the operations of I-Q detection in the pulse radar apparatus shown in FIG. 4.
Figure 25:
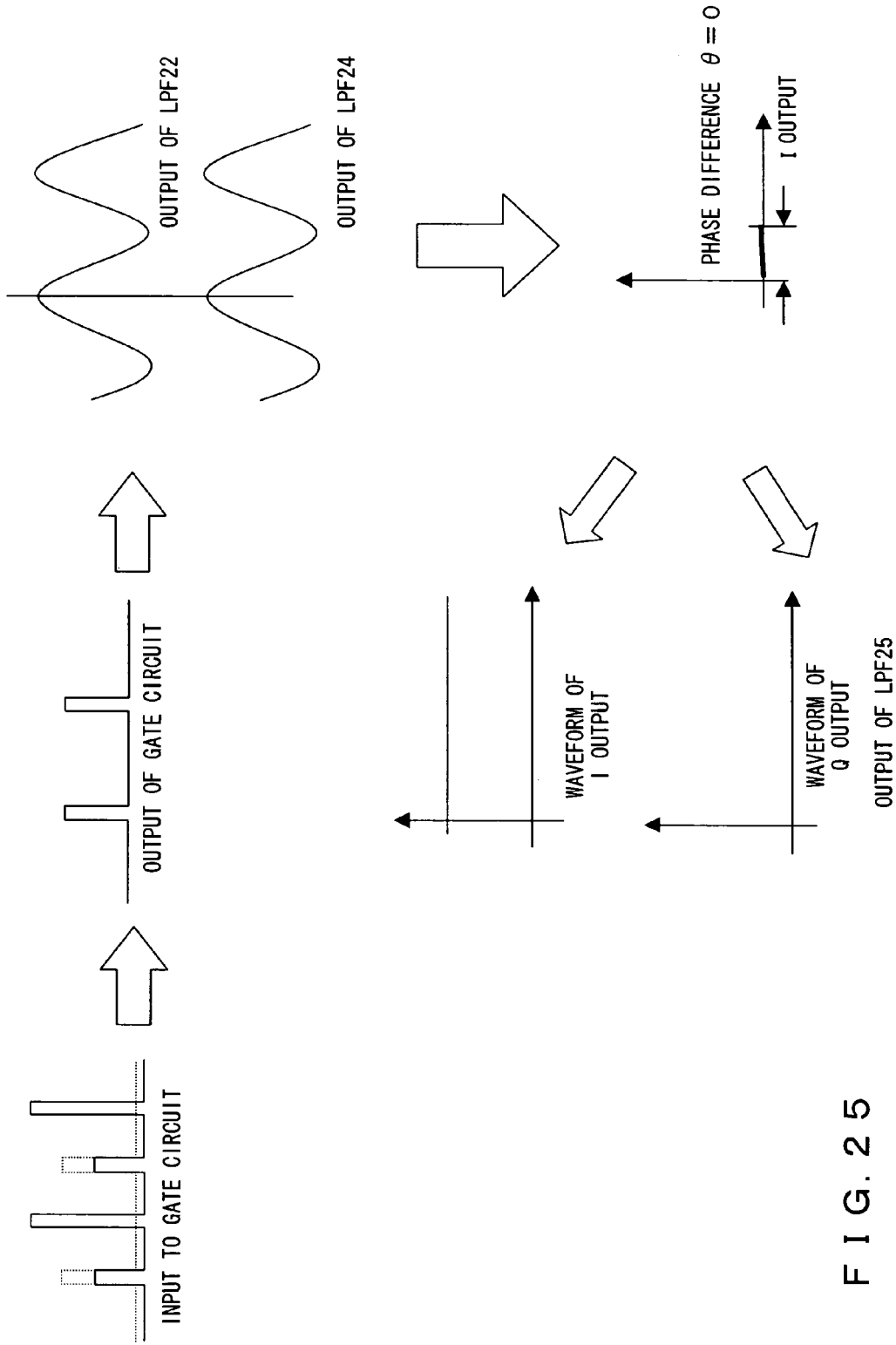
FIG. 25 explains the operations of I-Q detection in the embodiment 2.
Figure 26:
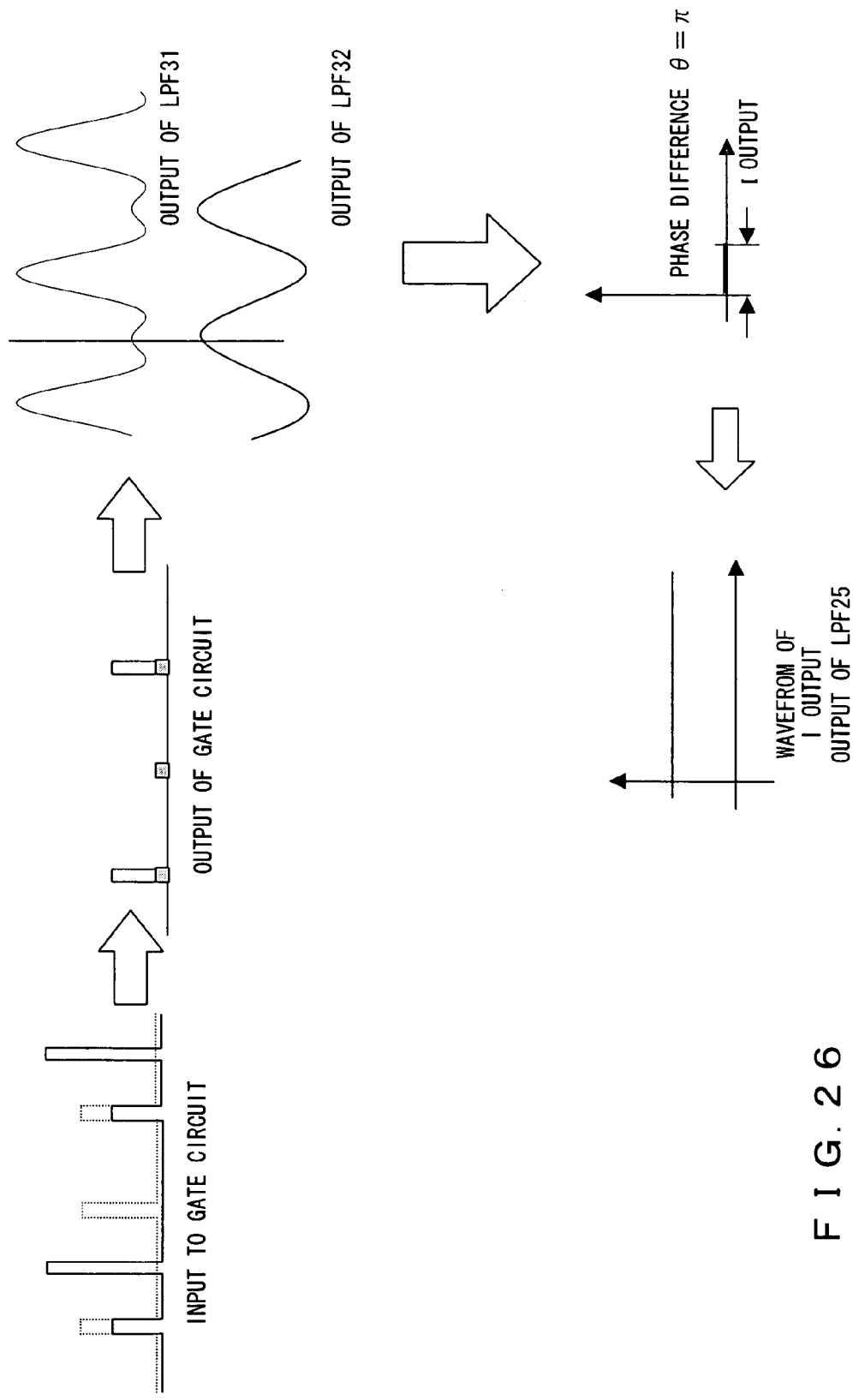
FIG. 26 explains the operations of I-Q detection in the embodiment 3.

FIGS. 24 to 26 explain the operation of the I-Q detection in the embodiment 2 and 3 in further detail in comparison with the operations of the I-Q detection in the pulse radar apparatus shown in FIG. 4. FIG. 24 explains the operations of the I-Q detection in FIG. 4. Here, a phase difference θ exists between the output of the low-pass filter 22 and the local signal as the output of the low-pass filter 24 in FIG. 4, and the I and the Q components are output due to the phase difference θ.

FIG. 25 explains the operation of the detection made by the mixer 33 in the embodiment 2 shown in FIG. 22. In the embodiment 2, the phase difference θ between the reception signal output from the low-pass filter 22 and the local signal as the output of the low-pass filter 24 becomes 0, and the output of the mixer 33 is therefore composed of only the I component.

FIG. 26 explains the operation of the detection made by the mixer 33 in the embodiment 3 shown in FIG. 23. The embodiment 3 assumes that the output waveform of the low-pass filter 31 includes part of the leak component of the gate circuit 21 as described above, and becomes, for example, a waveform described in part 4) of FIG. 20. Phases of the local signal as the output of the low-pass filter 32 and the leak component match, and the phase difference θ between the reception signal and the local signal is π. Accordingly, only the I component is output from the mixer 33. Since the phase difference is π, the sign of the I component of the output of the mixer 33 is inverted. However, the issue is the amplitude (absolute value) of the signal, and the inversion of the sign does not exerts an influence on the subsequent operations.

An embodiment 4 of the pulse radar apparatus according to the present invention is described next. Unlike the embodiment 1 to 3, the embodiment 4 frequency-modulates an output signal of a continuous wave oscillator, creates an ASK pulse from the resultant signal, and transmits the pulse. The base configuration of such a pulse radar apparatus is shown in FIG. 27, and its operations are described with reference to FIGS. 28 to 31.

Figure 27:
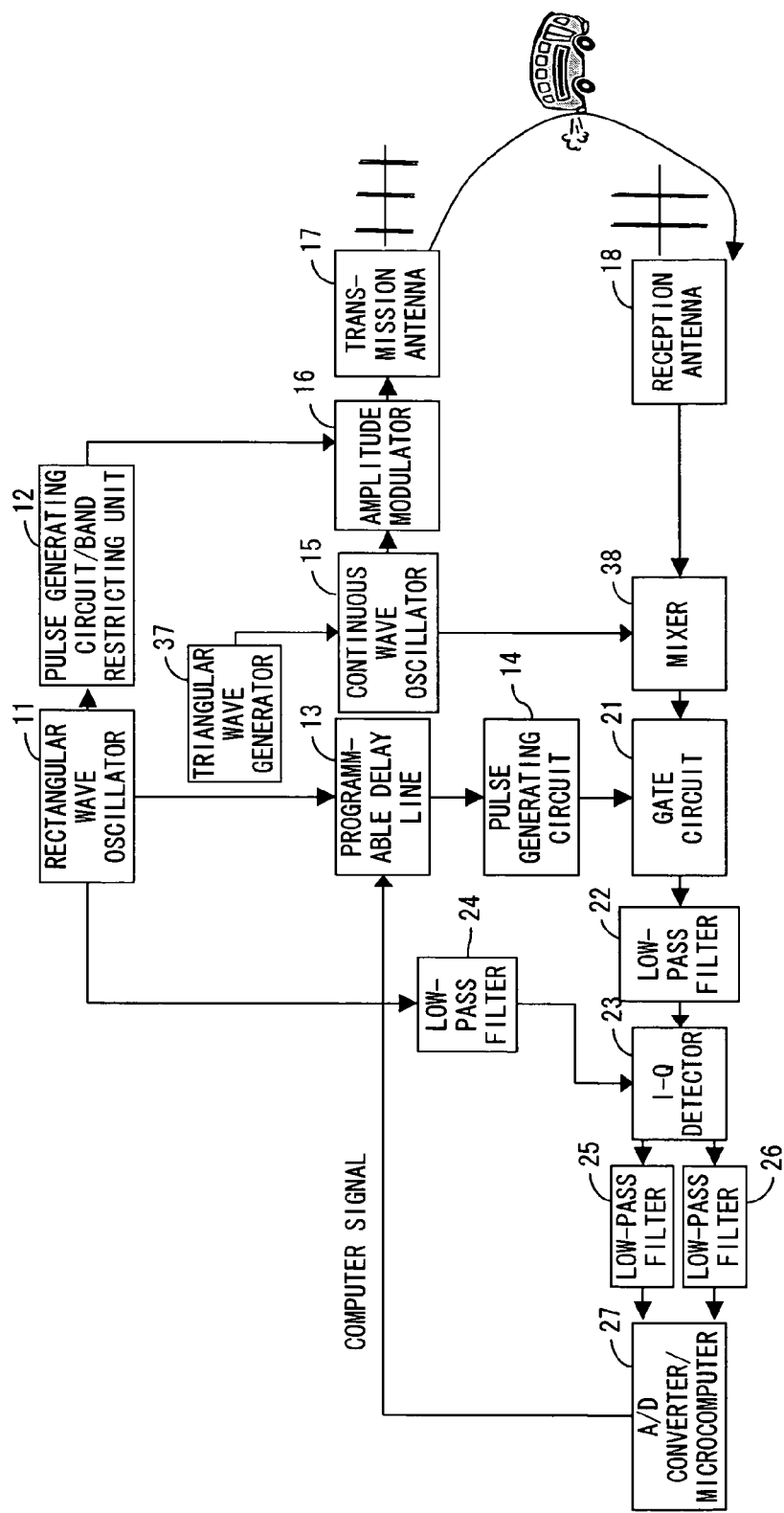
FIG. 27 is a block diagram showing the configuration of an ASK pulse radar apparatus of an FM modulation method.

In FIG. 27, an output signal of the continuous wave oscillator (voltage control oscillator VCO) 15 is frequency-modulated by a triangular wave which is output from a triangular wave generator 37, and the frequency-modulated continuous wave is modulated to a transmission pulse by an amplitude modulator 16 in a similar manner as in FIG. 4, and transmitted from a transmission antenna 17 to a target.

The reception pulse received by the reception antenna 18 is homodyne-detected by a mixer 38 with the use of the output of the continuous wave oscillator 15, and the result is given to the gate circuit 21. Operations in the other portions are fundamentally the same as those in FIG. 4.

Figure 29:
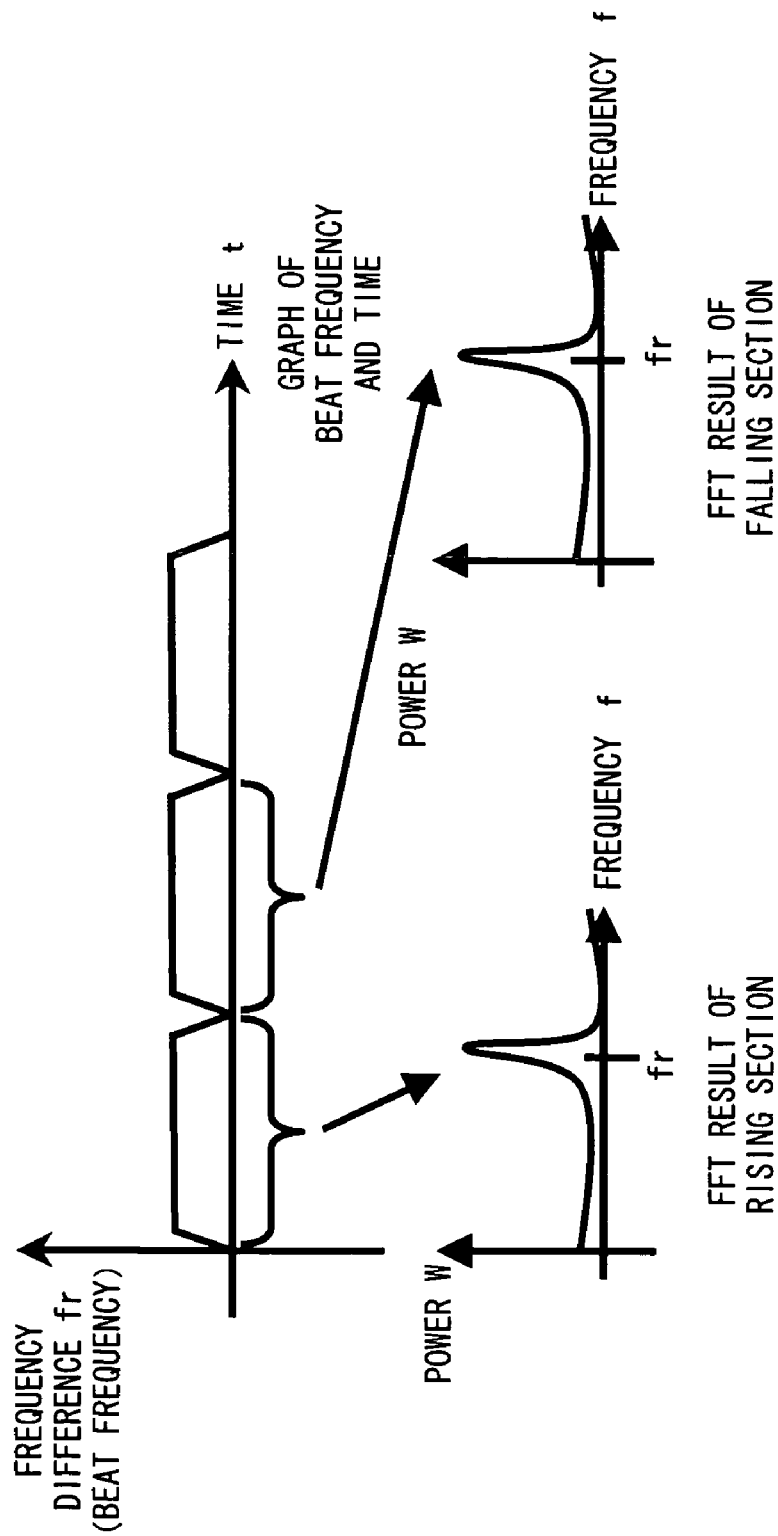
FIG. 29 explains the frequency of a beat signal.

FIGS. 28 and 29 explain the operations of the frequency-modulation, and the frequency of the beat signal obtained as the output of the mixer 38 in the pulse radar apparatus shown in FIG. 27. In FIG. 28, a frequency f of a transmission wave (part of a continuous wave) repeatedly rises and falls in a linear manner at a frequency $f_o$ as a central line in a range of $\Delta f$. The repetitive frequency of this modulation is $f_m$.

Since the transmission wave is transmitted as a pulse, and also the reception wave is received as a pulse as described above, the frequency of the reception wave is represented as an intermittent waveform. The reception wave is delayed by a time amount that corresponds to the round-trip time of the radio wave to the target, and a frequency difference $f_r$ occurs between the transmission wave and the reception wave.

FIG. 29 shows the frequency difference, namely, the frequency of the beat signal as the output of the mixer 38, that is, the beat frequency. The absolute value of this difference becomes almost constant in rising and falling sections of the frequency as shown in FIG. 29. Accordingly, if fast Fourier transform (FFT) for the reception signal is performed, the reception power has a peak for the frequency difference $f_r$. This description corresponds to the case where one target is standing still, and a description corresponding to a case where the target is moving is omitted.

Figure 30:
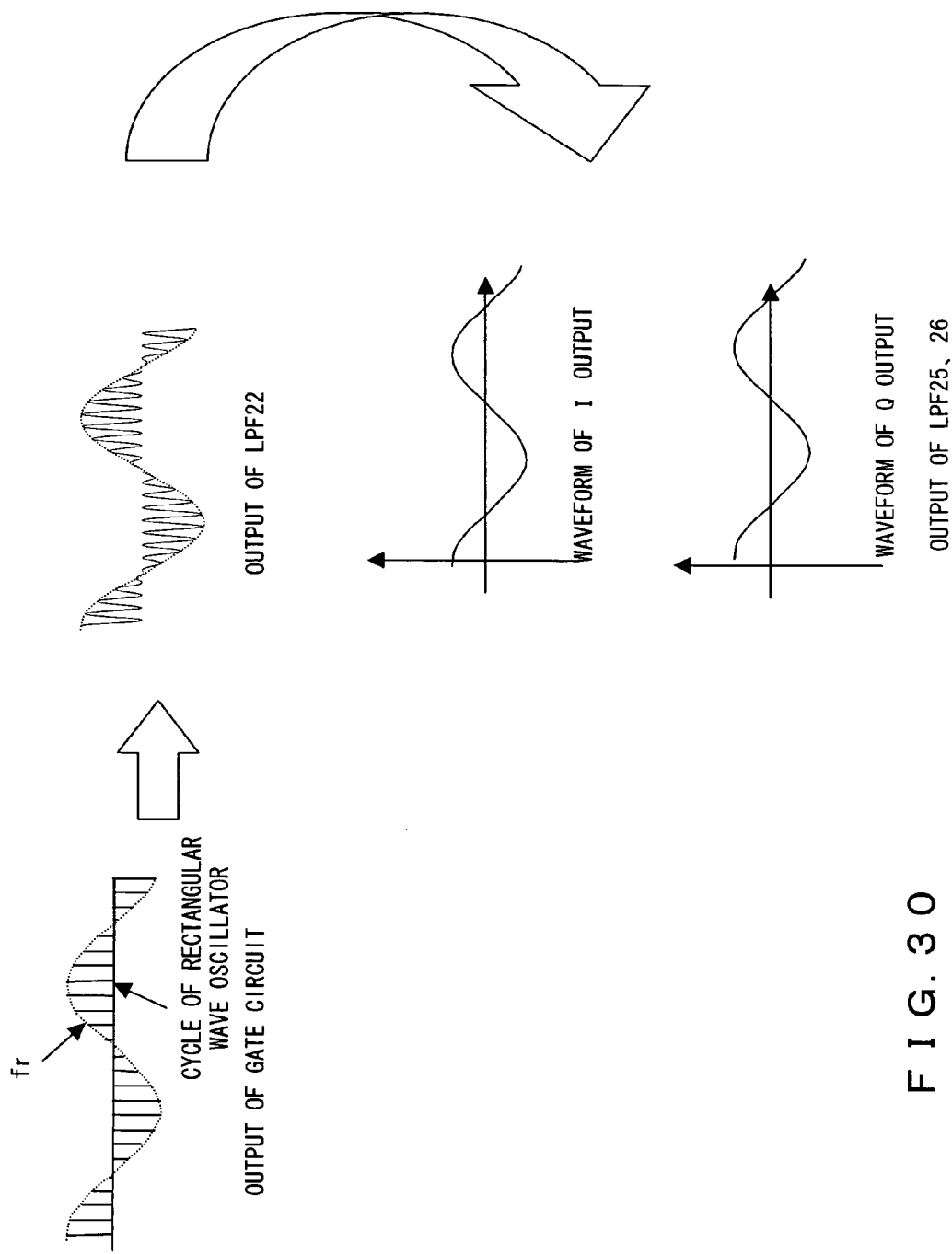
FIG. 30 explains an action of detection in the pulse radar apparatus shown in FIG. 27.

FIG. 30 explains the output waveform of the gate circuit 21, and the operations of the detection made by the I-Q detector 23 in the pulse radar apparatus shown in FIG. 27. This figure shows the state where the gate pulse and the reflection signal pulse match. The output of the gate circuit 21 is given as a pulse sequence corresponding to each gate pulse. The pulse sequence is a sequence obtained by multiplying the frequency difference $f_r$ by the sinusoidal wave output from the continuous wave oscillator 15 by the mixer 38. The low-pass filter 22 extracts a component equal to or lower than the base wave frequency (10 MHz) of the output of the rectangular wave oscillator 11, the I-Q detection is made, and the low-pass filters 25 and 26 cut the component of 10 MHz, so that the I and the Q components are obtained as outputs.

FIG. 31 explains the influence of the distance to a target on the beat frequency in the pulse radar apparatus shown in FIG. 27. As described with reference to FIG. 28, the beat frequency $f_r$ is determined by the delay time of the reception wave from the transmission waveform, which corresponds to the distance between the pulse radar apparatus and the target. Accordingly, the frequency of the beat signal becomes low if the distance to the target is short, and becomes high if the distance is long.

If a data obtainment range in the signal processing executed by the microcomputer 27 shown in FIG. 27 is made constant, data in the vicinity of a portion where the beat signal crosses at 0 can be possibly obtained if the beat frequency is low, so that the value of the signal becomes small, and the accuracy of the signal processing is deteriorated. In such a case, widening the data obtainment area can solve this problem, but it consumes time. Or, if the distance is long, the frequency of the beat signal is high, and the cutoff frequencies of the low-pass filters 25 and 26 cannot be lowered, so that also the noise component passes through the filters, and the S/N ratio is deteriorated.

FIG. 32 is a block diagram showing the configuration of the embodiment 4 of the pulse radar apparatus according to the present invention. Comparing with the pulse radar apparatus shown in FIG. 27, a difference exists in a point that the signal from the A/D converter/microcomputer 27, namely, the computer signal is given to the continuous wave oscillator 15 instead of the output of the triangular wave generator 37. The computer signal is given not only to the continuous wave generator 15 but also to the programmable delay line 13. The signal given to the programmable delay line 13 determines the delay amount of the rectangular wave generated by the rectangular wave oscillator 11, whereas the signal given to the continuous wave oscillator 15 is the signal for determining a repetitive frequency $f_m$ of the frequency modulation or its modulation width $\Delta f$, which is described with reference to FIG. 28.

A pulse transmitting unit, and a modulation controlling unit in claim 5 respectively correspond to the amplitude modulator 16 and the transmission antenna 17, and the A/D converter/microcomputer 27.

FIG. 33 explains the relationship between the beat frequency $f_r$ and the distance D to a target. The relationship among the distance D, the frequency $f_m$, and the modulation width $\Delta f$ is given by the following equation if the velocity of light is defined to be c. This equation is obtained by partially modifying the equation described in Document "Okubo, Fujimura, Kondo, 60 GHz band Millimeter-Wave Automotive Radar, FUJITSU vol. 47, no. 4, pp. 332–337 (07, 1995)".

$$D = Cf_r/4\Delta f \cdot fm \tag{5}$$

The frequency $f_r$ of the beat signal is given by the following equation by modifying the equation (5).

$$f_r = \frac{4\Delta f \cdot f_m}{c} D \tag{6}$$

Namely, the relationship between the frequency $f_r$ of the beat signal and the distance D is represented by a linear line as in FIG. 33 if $f_m$ and $\Delta f$ are made constant.

The distance D to a target corresponds to the delay amount of the gate pulse in the gate circuit 21. Accordingly, the distance D is obtained in response to the delay amount given by the programmable delay line 13 by using the relationship between D and the delay amount (corresponding to the round-trip time of the radio wave), and the frequency $f_m$ or the modulation width $\Delta f$ is determined by the following equation in response to the value of the distance D, whereby the frequency $f_r$ of the beat signal can be made constant.

$$f_m = \frac{f_r c}{4D\Delta f} \quad (7)$$

$$\Delta f = \frac{f_r c}{4D\Delta f} \quad (8)$$

Accordingly, the distance D is varied with a change in the delay amount, and the repetitive frequency fm of the frequency modulation or its modulation width Δf is varied with the change according to the above described equation, whereby the beat frequency can be held almost constant even if the distance D varies.

FIG. 34 shows, for example, a time vs. I output wave form when the repetitive frequency $f_m$ of the frequency modulation or its modulation width Δf is varied with the distance. In this case, suitable data (data of 1 to several cycles) can be obtained in a certain data obtainment range regardless of whether the distance to a target is short or longer. Additionally, the cutoff frequencies of the low-pass filters 25 and 26 can be lowered.

Either or both of the repetitive frequency $f_m$ of the frequency modulation and its modulation width Δf may be changed. Actually, since a hardware restriction exists, it is practical to suitably change both of them.

The present invention is available to every industry using a radar, to say nothing of a radar manufacturing industry.

What is claimed is:

1. A radar apparatus detecting a target by transmitting a pulse signal, comprising:
   a first signal generating unit generating a first signal, which becomes a base of generation of a transmission pulse;
   a second signal generating unit generating a second signal that has a frequency which is a multiple or a submultiple of the first signal, a phase angle of 0 for the second signal intermittently matching that for the first signal;
   a control pulse generating unit generating a control pulse signal by delaying the second signal; and
   a gate unit performing a gate operation for a reception signal by using the control pulse signal, wherein the reception signal is obtained from a detector.

2. The pulse radar apparatus according to claim 1, further comprising:
   a detecting unit detecting an output of said gate unit; and
   a distance calculating unit calculating a distance to a target by using an output of said detecting unit when said control pulse generating unit changes an amount of a delay.

3. The pulse radar apparatus according to claim 1, further comprising
   a modulation signal generating unit generating a pulse from a signal which becomes the base of generation of the transmission pulse, and generating a modulation signal for generating a transmission pulse by band-restricting a spectrum range of the pulse.

4. A pulse radar apparatus detecting a target by transmitting a pulse signal, comprising:
   a signal delaying unit delaying a signal which becomes a base of generation of a transmission pulse;
   a control pulse generating unit generating a control pulse signal by using the delayed signal;
   a gate unit performing a gate operation for a reception signal by using the control pulse signal; and
   a reflection signal detecting unit detecting a reflection signal from a target which exists in a distance corresponding to a delay time by using an output of said signal delaying unit based on an output of said gate unit.

5. The pulse radar apparatus according to claim 4, further comprising
   a distance calculating unit calculating a distance to a target by using an output of said reflection signal detecting unit when said signal delaying unit changes a delay amount.

6. The pulse radar apparatus according to claim 4, further comprising
   a modulation signal generating unit generating a pulse from a signal which becomes the base of generation of the transmission pulse, and generating a modulation signal for generating a transmission pulse by band-restricting a spectrum range of the pulse.

7. A pulse radar apparatus detecting a target by transmitting a pulse signal, comprising:
   a first signal generating unit generating a first signal, which becomes a base of generation of a transmission pulse;
   a second signal generating unit generating a second signal that has a frequency which is a multiple or a submultiple of the first signal, a phase angle of 0 for the second signal matching the first signal at least intermittently;
   a control pulse generating unit generating a control pulse signal by delaying the second signal;
   a gate unit performing a gate operation for a reception signal by using the control pulse signal;
   a signal delaying unit delaying the first signal according to a delay amount of the control pulse signal generated by said control pulse generating unit; and
   a reflection signal detecting unit detecting a reflection signal from a target which exists in a distance corresponding to a delay time by using an output of said signal delaying unit based on an output of said gate unit.

8. The pulse radar apparatus according to claim 7, further comprising
   a distance calculating unit calculating a distance to a target by using an output of said reflection signal detecting unit when said control pulse generating unit changes the delay amount.

9. The pulse radar apparatus according to claim 7, further comprising
   a modulation signal generating unit generating a pulse from a signal which becomes the base of generation of the transmission pulse, and generating a modulation signal for generating a transmission pulse by band-restricting a spectrum range of the pulse.

10. A pulse radar apparatus detecting a target by transmitting a pulse signal, comprising:
    a pulse transmitting unit outputting a transmission pulse signal by using a pulse signal generated from a signal which becomes a base of generation of a transmission pulse and a frequency-modulated continuous wave;
    a control pulse generating unit generating a control pulse signal by delaying the signal which becomes the base of generation of a transmission pulse;
    a gate unit performing a gate operation for a reception signal by using the control pulse signal, wherein the reception signal is obtained from a detector; and a modulation controlling unit controlling a frequency modulation width in frequency modulation, and/or a repetitive frequency of the modulation in response to a signal delay amount generated by said control pulse generating unit.

11. The pulse radar apparatus according to claim 10, further comprising:

a detecting unit detecting an output of said gate unit; and a distance calculating unit calculating a distance to a target by using an output of said detecting unit when said control pulse generating unit changes the delay amount.

12. The pulse radar apparatus according to claim 10, further comprising a modulation signal generating unit generating a modulation signal for generating a transmission pulse by band-restricting a spectrum range of the pulse signal generated from the signal which becomes the base of generation of a transmission pulse, and giving the generated signal to said pulse transmitting unit.

* * * * *